United States Patent
Nadgowda et al.

(10) Patent No.: US 10,778,709 B2
(45) Date of Patent: Sep. 15, 2020

(54) CLOUD-NATIVE EXTENSIBILITY PROVIDED TO SECURITY ANALYTICS

(71) Applicant: International Business Machines Corporation, Armonk, NY (US)

(72) Inventors: Shripad Nadgowda, White Plains, NY (US); Canturk Isci, Ridgewood, NJ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 99 days.

(21) Appl. No.: 16/176,499

(22) Filed: Oct. 31, 2018

(65) Prior Publication Data

US 2020/0137091 A1 Apr. 30, 2020

(51) Int. Cl.
H04L 29/06 (2006.01)

(52) U.S. Cl.
CPC ...... *H04L 63/1425* (2013.01); *H04L 63/1433* (2013.01); *H04L 63/168* (2013.01)

(58) Field of Classification Search
None
See application file for complete search history.

(56) References Cited

U.S. PATENT DOCUMENTS

| | | | |
|---|---|---|---|
| 5,951,703 A | | 9/1999 | Sprouse et al. |
| 6,115,817 A | * | 9/2000 | Whitmire ............ H04L 63/0442 380/28 |
| 9,563,480 B2 | | 2/2017 | Messerli et al. |
| 2012/0246370 A1 | | 9/2012 | Zhang |
| 2013/0124400 A1 | | 5/2013 | Hawkett |
| 2014/0370064 A1 | | 12/2014 | Lee et al. |

(Continued)

FOREIGN PATENT DOCUMENTS

| CN | 101271401 A | 9/2008 |
|---|---|---|
| CN | 101782861 A | 7/2010 |
| CN | 104861172 A | 8/2015 |

OTHER PUBLICATIONS

Zhao et al., "Cationic Oligo(thiophene ethynylene) with Broad-Spectrum and High Antibacterial Efficiency under White Light and Specific Biocidal Activity against S. aureus in Dark", Applied Materials and Interfaces, vol. 8, 2016, pp. 1019-1024.

(Continued)

*Primary Examiner* — Andrew J Steinle
(74) *Attorney, Agent, or Firm* — Amin, Turocy & Watson, LLP

(57) ABSTRACT

Techniques facilitating cloud-native extensibility provided to security analytics are provided. A system comprises a memory that stores, and a processor that executes, computer executable components. The computer executable components can comprise a security component that implements an instance of an encapsulated security application. The encapsulated security application can be embedded into a container image as an extended analytic script. The computer executable components can also comprise an execution component that applies the instance of the encapsulated security application to a simulated system state of a computing device during subsequent scanning operations that result in respective analytics for scanning operations of the subsequent scanning operations.

17 Claims, 15 Drawing Sheets

(56) References Cited

U.S. PATENT DOCUMENTS

| | | | |
|---|---|---|---|
| 2015/0200941 A1* | 7/2015 | Muppidi | H04L 63/20 726/1 |
| 2015/0301848 A1 | 10/2015 | Roehrig et al. | |
| 2015/0335760 A1 | 11/2015 | Lee et al. | |
| 2017/0237778 A1* | 8/2017 | DiGiambattista | G06N 20/00 726/1 |
| 2019/0227824 A1* | 7/2019 | Kuchoor | G06F 9/45512 |

OTHER PUBLICATIONS

Appel et al., "Toward biodegradable nanogel star polymers via organocatalytic ROP", The Royal Society of Chemistry, vol. 48, 2012, pp. 6163-6165.

Fuhrhop, J.-H., "Porphyrin Assemblies and Their Scaffolds", Langmuir, American Chemical Society, 2013, 12 pages.

Lee et al., "Nanogel Star Polymer Architectures: A Nanoparticle Platform for Modular Programmable Macromolecular Self-Assembly, Intercellular Transport, and Dual-Mode Cargo Delivery", Advanced Materials, vol. 23, 2011, pp. 4509-4515.

Xing et al., "Conjugated Polymer/Porphyrin Complexes for Efficient Energy Transfer and Improving Light-Activated Antibacterial Activity", JACS Articles, vol. 131, 2009, pp. 13117-13124.

Bing, Guo, "Synthesis of Novel Photoactive Degradable Polymers with Potential in Biomedical Applications", 2013, 251 pages.

Yang et al., "Broad-Spectrum Antimicrobial Star Polycarbonates Functionalized with Mannose for Targeting Bacteria Residing inside Immune Cells", Advanced Healthcare Materials, 2016, pp. 1-10.

Chan et al., "Tetra-n-butylammonium Fluoride as an Efficient Transesterification Catalyst for Functionalizing Cyclic Carbonates and Aliphatic Polycarbonates", ACS Macro Letters, vol. 2, 2013, pp. 860-864.

Chin et al., "Biodegradable Broad-Spectrum Antimicrobial Polycarbonates: Investigating the Role of Chemical Structure on Activity and Selectivity", Macromolecules, ACS publication, vol. 46, 2013, pp. 8797-8807.

Dove et al., "Thiourea-Based Bifunctional Organocatalysis: Supramolecular Recognition for Living Polymerization", JACS Communications, American Chemical Society, vol. 127, 2005, pp. 13798-13799.

Hynek et al., "Design of porphyrin-based conjugated microporous polymers with enhanced singlet oxygen productivity", Royal Society of Chemistry, vol. 6, 2016, pp. 44279-44287.

Kammerlander et al., "A clinical evaluation of the efficacy and safety of singlet oxygen in cleansing and disinfecting stagnating wounds", Journal of Wound Care, vol. 20, No. 4, 2011, pp. 149-158.

Kralova et al., "Glycol Porphyrin Derivatives as Potent Photodynamic Inducers of Apoptosis in Tumor Cells", American Chemical Society, vol. 51, 2008, pp. 5964-5973.

Lohmeijer et al., "Guanidine and Amidine Organocatalysts for Ring-Opening Polymerization of Cyclic Esters", Macromolecules, American Chemical Society, vol. 39, 2006, pp. 8574-8583.

Oyinloye et al., "Reactive Oxygen Species, Apoptosis, Antimicrobial Peptides and Human Inflammatory Diseases", Pharmaceuticals, vol. 8, 2015, pp. 151-175.

Rumyantseva et al., "Improved Method of 5,10,15,20-Tetrakis(4-hydroxyphenyl)—porphyrins Synthesis", ISUCT, Macroheterocycles, vol. 6, No. 1, 2013, pp. 59-61.

Stoller et al., "Oxygen Therapy for Patients With COPD Current Evidence and the Long-Term Oxygen Treatment Trial", Recent Advances in Chest Medicine, vol. 138, No. 1, 2010, pp. 179-187.

Vatansever et al., "Antimicrobial strategies centered around reactive oxygen species-bactericidal antibiotics, photodynamic therapy and beyond", May 16, 2013, 87 pages.

International Search Report and Written Opinion received for PCT Application Serial No. PCT/IB2018/058785 dated Feb. 27, 2019, 10 pages.

Notice of Allowance for U.S. Appl. No. 15/813,437 dated Jun. 26, 2019, 25 pages.

List of IBM Patents or Applications Treated as Related.

Mell et al., "The NIST Definition of Cloud Computing," National Institute of Standards and Technology, Sep. 2011, 7 pages, Special Publication 800-145, U.S Department of Commerce.

Suneja et al., "Non-intrusive, Out-of-band and Out-of-the-box Systems Monitoring in the Cloud," SIGMETRICS'14, Jun. 2014, pp. 249-261, ACM, 13 pages.

Banikazemi et al., "Sysman: A Virtual File System for Managing Clusters," 22nd Large Installation System Administration Conference, 2008, pp. 167-174, 8 pages.

Anonymous, "Entity-Data Resolution and Effector Selection in Cloud Management Systems," Mar. 11, 2013, IPCOM000225888D, 4 pages.

Anonymous, "Cloud Management Enhancements Using State Transition Diagrams as Components of Cloud Resource Attribute Metadata," Feb. 25, 2013, IPCOM000225668D, 4 pages.

Anonymous, "System and Methods to Efficiently Manage Workload Patterns in the Cloud," Jan. 31, 2013, IPCOM000225221D, 7 pages.

Anonymous, "Method of Virtual Solution Process Management in Cloud," Dec. 16, 2010, IPCOM000202456D, 6 pages.

"S3fs-fuse: FUSE-based file system backed by Amazon S3," GitHub, Inc., 3 pages. Retrieved on Nov. 6, 2017. https://github.com/s3fs-fuse/s3fs-fuse.

"Ovh/svfs: The Swift Virtual File System," GitHub, Inc., 5 pages. Retrieved on Nov. 6, 2017. https://github.com/ovh/svfs.

"Docker Engine managed plugin system," Docker Documentation, Docker Inc., 7 pages. Retrieved on Oct. 24, 2018. https://docs.docker.com/engine/extend/#developing-a-plugin.

"Agentless System Crawler," cloudviz, GitHub, Inc., 4 pages. Retrieved on Oct. 24, 2018. https://github.com/cloudviz/agentless-system-crawler.

"Plugins," OpenStack Docs, OpenStack, 10 pages. Retrieved on Oct. 24, 2018. https://docs.openstack.org/devstack/latest/plugins.html.

"Web APIs," Google Chrome, 2 pages. Retrieved on Oct. 24, 2018. https://developer.chrome.com/extensions/api_other.

"Tableau Extensions API," GitHub, Inc., 3 pages. Retrieved on Oct. 24, 2018. https://github.com/tableau/extensions-api.

Examination Report under Section 18(3) for Great Britain Application Serial No. GB2007968.7 dated Jul. 1, 2020, 2 pages.

* cited by examiner

CLOUD-NATIVE EXTENSIBILITY PROVIDED TO SECURITY ANALYTICS

BACKGROUND

The subject disclosure relates to a cloud computing environment including one or more virtual machines, containers, or bare-metal systems and more specifically, security solutions for a cloud computing environment.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses, and/or computer program products that facilitate cloud-native extensibility provided to security analytics are provided.

According to an embodiment a system can comprise a memory that stores computer executable components and a processor that executes the computer executable components stored in the memory. The computer executable components can comprise a security component that implements an instance of an encapsulated security application. The encapsulated security application can be embedded into a container image as an extended analytic script. The computer executable components can also comprise an execution component that applies the instance of the encapsulated security application to a simulated system state of a computing device during subsequent scanning operations that result in respective analytics for scanning operations of the subsequent scanning operations.

Another embodiment provided relates to a computer-implemented method that can comprise implementing, by a system operatively coupled to a processor, an instance of an encapsulated security application. The encapsulated security application can be embedded into a container image as an extended analytic script. The computer-implemented method can also comprise applying the instance of the encapsulated security application to a simulated system state of a computing device during subsequent scanning operations that result in respective analytics for scanning operations of the subsequent scanning operations.

Another embodiment provided herein relates to a computer program product that facilitates cloud-native extensibility provided to security analytics. The computer program product can comprise a computer readable storage medium having program instructions embodied therewith. The program instructions are executable by a processor to cause the processor to implement an instance of an encapsulated security application. The encapsulated security application can be embedded into a container image as an extended analytic script. The program instructions can also cause the processor to apply the instance of the encapsulated security application to a simulated system state of a computing device during subsequent scanning operations that result in respective analytics for scanning operations of the subsequent scanning operations.

DETAILED DESCRIPTION

Figure 1:
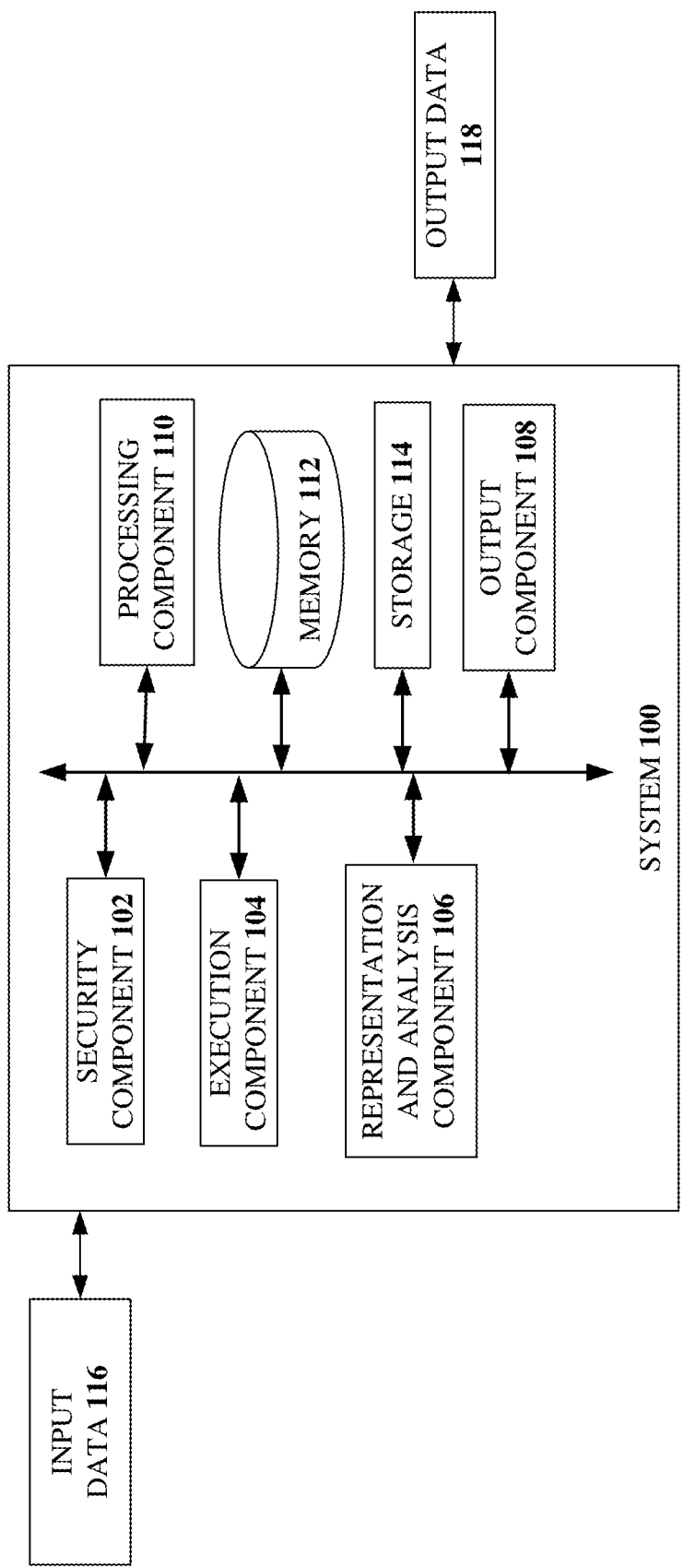
FIG. 1 illustrates a block diagram of an example, non-limiting, system that facilitates cloud-native extensibility provided to security analytics in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Cloud computing systems can enable a shared source of configurable resources, which can be rapidly provisioned. Due to the rapidly changing nature of cloud computing systems, some technologies to manage and control the devices of the cloud computing systems can relate to building a system interface. However, building these system interfaces refers to building a non-standard data model that can be used for accounting and management purposes. Thus, conventional cloud computing systems can be often inefficient due to the reuse of tools that were designed for static computing devices. In addition, some technologies discuss system modeling over the data. However, the modeling does not expose the data as a native system interface. Therefore, conventional cloud computing systems can be improved.

Embodiments described herein comprise systems, computer-implemented methods, and computer program products that can provide cloud-native extensibility. For example, various tools and practices can be utilized to build and deliver new extensions through one or more docker images. In some cases, the new extensions can be subjected to standard DevOps practices. Due to the dis-aggregated framework of systems discussed herein, a new extension can be built and delivered once, and it can be applied to all cloud systems (e.g., virtual machines, containers, hosts, and so on) as opposed to the state-of-art solution of installing it on every system. Further, execution of the new extension can be sandboxed through various namespaces and/or capabilities.

The various aspects discussed herein can apply equally to containers, virtual machines, and/or bare-metal systems. In this detailed description, although various aspects are discussed with respect to containers, the various aspects can be also applied to virtual machines. Further, as discussed herein, extension applications can cover all native analytics, monitoring, and/or compliance tools. In addition, the various aspects allow extension with applications that expects native system interface to run without any modifications. The various aspects can also provision a novel operating environment in order to leverage existing container management tools to build and deliver new application extensions. Thus, with the cloud native solution seemless and secure extensions can be achieved. The extensions can be plugin-based extensions and/or Application Program Interface (API)-based extensions.

Further, various embodiments relate to techniques (e.g., software orchestration and management) to execute black-box software applications over a pseudo-system interface. For example, execution of black-box software applications can facilitate execution of new (or emerging) applications and/or legacy applications. Further, the various embodiments can provide the ability to multiplex software execution over multiple instances of virtual machines, containers, and/or bare-metal systems using an overlay file system design. In addition, the various embodiments can facilitate creation of a continual or continual monitoring and notification service decoupled from the "real" system.

Thus, as discussed herein, the various aspects can relate to performing data analytics by collecting and converting data about applications and systems on the cloud into a consumable format. For example, data about a system (e.g., a computing device) can be extracted and input into a format that can be utilized with both legacy solutions or near emerging solutions (e.g., black box technique) that can execute on a running system, such as a laptop or virtual machine in the cloud. Since the various aspects convert everything from the converted data, the solutions cannot be executed "as is." Therefore, as discussed herein, the various aspects can modify the data such that the data can be represented as a computing system. Thus, for the applications that are running on a computing system (e.g., a computing device), the applications operate as if they are running on the computing system (e.g., a laptop), however, behind the scenes there can be an intermediate layer of software and system components that abstract away the data. Thus, the various aspects can provide the look and feel of a computing system, but exposed from view (e.g., behind the scenes) it can be asking the data the question that the application is requesting (e.g., the various aspects can be interfacing between an entity and the application). For example, there can be a compliance checker or a wireless detector that can be running in the system (e.g., laptops, virtual machines, and/or containers running in the cloud). When the wireless checker expects to run on the system, a "veneer" can be presented and the wireless checker can be installed or run on that veneer. The wireless checker believes it is running on the system perfectly fine and performs its usual execution (e.g., collect data, perform analysis, and so on), however, it is operating with respect to data, not the system.

As discussed herein, the various aspects can run one or more legacy applications and/or one or more emerging applications against the data. Accordingly, the various aspects can remain in the cloud and the one or more solutions can run the one or more legacy applications (e.g., black box) and/or one or more emerging applications without having to reimplement (e.g., reverse engineer) the applications. As such, accuracy of a cloud computing system and/or efficiency of a cloud computing system can be improved. Furthermore, performance devices associated with a cloud computing system can be improved, efficiency of devices associated with a cloud computing system can be improved, and/or another characteristic of devices associated with a cloud computing system can be improved.

FIG. 1 illustrates a block diagram of an example, non-limiting, system 100 that facilitates cloud-native extensibility provided to security analytics in accordance with one or more embodiments described herein. Aspects of systems (e.g., the system 100 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

In various embodiments, the system 100 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 100 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

In various embodiments, the system 100 can be a cloud computing system associated with technologies such as, but not limited to, cloud circuit technologies, cloud computing technologies, artificial intelligence technologies, medicine and materials technologies, supply chain and logistics technologies, financial services technologies, and/or other digital technologies. The system 100 can employ hardware and/or software to solve problems that are highly technical in nature, that are not abstract and that cannot be performed as a set of mental acts by a human. Further, in certain embodiments, some of the processes performed can be performed by one or more specialized computers (e.g., one or more specialized processing units, a specialized computer with a cloud computing component, etc.) to carry out defined tasks related to representing an analyzing cloud computing data as pseudo systems and/or machine learning.

The system 100 and/or components of the system 100 can be employed to solve new problems that arise through advancements in technologies mentioned above, computer architecture, and/or the like. One or more embodiments of the system 100 can provide technical improvements to cloud computing systems, cloud circuit systems, cloud processor systems, artificial intelligence systems, and/or other systems. One or more embodiments of the system 100 can also provide technical improvements to a cloud processor by improving processing performance of the cloud processor, improving processing efficiency of the cloud processor, improving processing characteristics of the cloud processor, and/or improving power efficiency of the cloud processor.

In the embodiment shown in FIG. 1, the system 100 can comprise a security component 102, an execution component 104, a representation and analysis component 106, an output component 108, a processing component 110, a memory 112, and/or a storage 114. The memory 112 can store computer executable components and instructions. The processing component 110 (e.g., a processor) can facilitate execution of the instructions (e.g., computer executable components and corresponding instructions) by the security component 102, the execution component 104, the representation and analysis component 106, and/or other system components. As shown, in some embodiments, one or more of the security component 102, the execution component 104, the representation and analysis component 106, the output component 108, the processing component 110, the memory 112, and/or the storage 114 can be electrically, communicatively, and/or operatively coupled to one another to perform one or more functions of the system 100.

The security component 102 can receive, as input data, 116, a container image that comprises an encapsulated security application. For example, the encapsulated security application can be embedded into the container image as an extended analytic script. Based on the received input data 116, the security component 102 can implement an instance of the encapsulated security application.

The execution component 104 can apply the instance of the encapsulated security application to a simulated system state of a computing device. For example, the simulated system of the computing device can be facilitated by the representation and analysis component 106, as will be discussed in further detail below. Application of the instance of the encapsulated security application to the simulated system state of the computing device during subsequent scanning operations (e.g., via the execution component 104) can result in respective analytics for scanning operations of the subsequent scanning operations, which can be output, as output data 118, by the output component 108. For example, the subsequent scanning operations can be those scanning operations that occur after the execution component 104 applies the instance of the encapsulated security application to the simulated system state of the computing device. Thus, a first analytic can be output for a first subsequent scanning operation, a second analytic can be output for a second subsequent scanning operation, and so on.

The simulated system state can be decoupled, by the representation and analysis component 106, from an original operating state of the computing device and can comprise data abstracted from the original operating state. The data abstracted can represent an operation of the computing device.

According to some implementations, the representation and analysis component 106 can facilitate representing and analyzing cloud computing data as pseudo data (or simulated data). For example, as discussed herein, the representation and analysis component 106 can be referred to as a retrospective cloud computing introspection component or as conFuse (File System in User Space (Fuse) for a Container (con)). Through implementation of the representation and analysis component 106, the computing system can be converted to data, and back to a computing system. A confuse platform is a computing environment in which a standard and native pseudo or simulated-system interface from data captured from a "real" system can be built and executed. For example, the simulated-system interface can be decoupled from the real system. Accordingly, the simulated-system interface does not affect the real system.

For example, the representation and analysis component 106 can implement a crawler within a cloud computing environment. The crawler can collect information about containers, virtual machines, and so on and create a framework. For example, the cloud system can be configured into data (e.g., plain text or another file format). With the cloud system in the data format, various legacy tools cannot be executed since the legacy tools are designed to be installed in the cloud system and executed (e.g., ran) within the cloud system. Therefore, to run the legacy tools, the data would need to be converted back into the cloud system in order to run the legacy tools. This can increase run time since the cloud system would need to alternate between stop mode and start mode to run the legacy tools. Further, for immutable systems, such as containers, it requires re-building the image and re-deploying the containers. To address this and other issues, the disclosed aspects can dynamically extend and dynamically implement new security solutions for cloud systems (e.g., virtual machines, containers, hosts, and so on).

According to some implementations, the disclosed aspect can extend conFuse (e.g., the representation and analysis component 106) with new security applications. Further, the extensions can be built using container cloud native practices and tools. The new extended security capabilities can be dynamically implemented in conFuse over system states. In addition, running cloud systems (e.g., virtual machines, containers, hosts, and so on) can be protected against malicious applications, since they are implemented over a read-only system state.

The various aspects discussed herein can be extended in a container image. For example, an extension or some capability can be added to all the containers. Thus, instead of writing a script and delivering it, the script can be written and put in a container image. The container images can dynamically implement its respective functions for all the containers. This can protect the running systems since the new analytics area not run directly on the whole container but are being run separate from the container. Thus, nothing needs to be installed on the container. A crawler can collect data about the one or more containers. Thus, the functions/analytics can be implemented in isolation from the actual container, which can protect the running cloud system (virtual machines or containers) against malicious applications.

It is to be appreciated that the system 100 (e.g., the security component 102, the execution component 104, the representation and analysis component 106, and/or other system components) can perform cloud-native extensibility provided to security analytics, generation of a pseudo system state or a pseudo system interface, and/or black-box execution over the pseudo system state that cannot be performed by a human (e.g., is greater than the capability of a single human mind). For example, an amount of data processed, a speed of data processed and/or data types of data processed by the system 100 (e.g., the security component 102, the execution component 104, the representation and analysis component 106, and/or other system components) over a certain period of time can be greater, faster, and different than an amount, speed, and data type that can be processed by a single human mind over the same period of time. The system 100 (e.g., the security component 102, the execution component 104, the representation and analysis component 106, and/or other system components) can also be fully operational towards performing one or more other functions (e.g., fully powered on, fully executed, etc.) while also performing the above-referenced cloud-native extensibility provided to security analytics, generation of a pseudo system state/interface, and/or black-box execution over the pseudo system state. Moreover, the cloud-native extensibility provided to security analytics and/or generated and coordinated by the system 100 (e.g., the security component 102, the execution component 104, the representation and analysis component 106, and/or other system components) can include information that is impossible to obtain manually by a user. For example, a type of information included in the input data 116, a variety of information associated with the input data 116, and/or optimization of the input data 116 to generate and output the one or more respective analytics for scanning operations of the subsequent scanning operations (e.g., output data 118) can be more complex than information that can be obtained manually and processed by a user.

Figure 2:
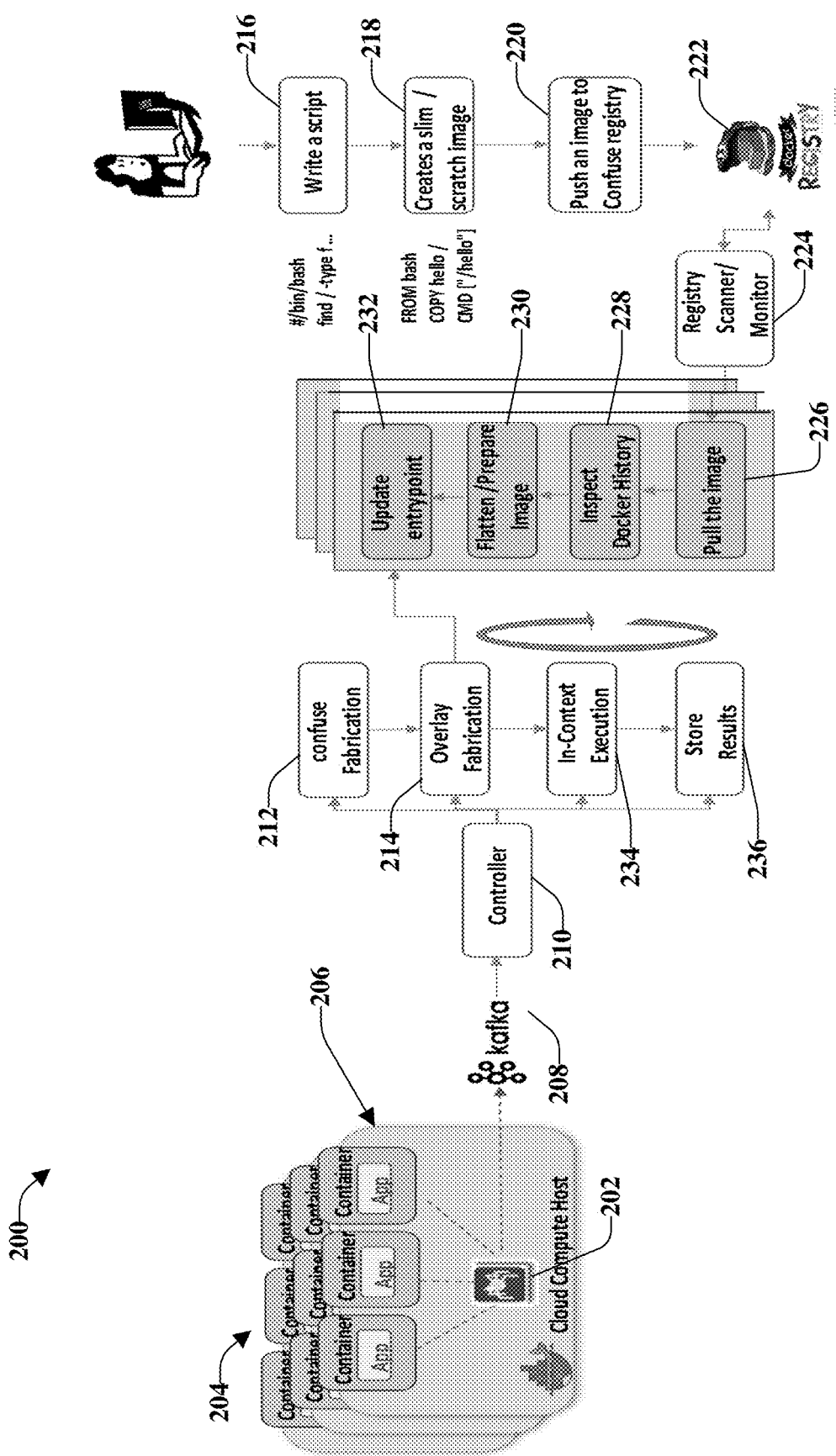
FIG. 2 illustrates an example, non-limiting, system of an architecture for cloud native extensibility accordance with one or more embodiments described herein.

FIG. 2 illustrates an example, non-limiting, system 200 of an architecture for cloud native extensibility in accordance with one or more embodiments described herein. Repetitive description of like elements employed in other embodiments described herein is omitted for sake of brevity.

As illustrated on the left of the figures, a crawler 202 can collect information about containers 204 and applications 206. The information collected by the crawler 202 can be sent to a component 208 (illustrated as a kafka component), which can receive information from the containers 204 and applications 206. The component 208 can operate as a message broker that receives the information and can relay the information to a controller 210. According to some implementations, the component 208 can translate the information from a first protocol, utilized by the containers 204 and/or applications 206 to a second protocol utilized by the controller 210. Thereafter, conFuse orchestration can occur. For example, in a conFuse fabrication component 212, the data can be converted back to the cloud system.

Upon or after conversion of the data, a cloud system orchestration of using overlay (e.g., overlay fabrication 214) can be performed. For example, a developer or other entity could want to extend one or more functions (e.g., implement a new capability, such as checking for crypto mining or checking for any user running bit coin mining in the container). In an example, an entity can build one or more docker images for a new security application. Thus, a script can be written, at 216.

Further, a container image can be created and the script can be embedded into the container image. A standard docker ecosystem (e.g. Dockerfile, docker-slim) can be leveraged to encapsulate the new security application into an image. Further, a scratch image can be provided, at 218. For example, the scratch image can be provided with just the executable script. In some implementations, execution runtimes can be provided by conFuse (e.g., bash).

At 220, the image can be pushed to the registry (e.g., the config registry). For example, the docker image can be pushed to a conFuse extension repository. The conFuse platform can maintain a separate image repository for hosting extension images. In some implementations, the new image can be pushed to the (new) conFuse image repository (e.g., docker registry 222).

Upon or after the image is pushed to docker registry 222, there can be a notification sent by the registry. For example, a registry monitor or scanner 224 can receive or generate a notification that there is a new image. The notification can indicate that there are new functions that should be extended into the cloud system. For example, the registry monitor or scanner 224 can be utilized to notify new security extension. For example, conFuse can implement the registry monitor or scanner 224 that can identify whether a new image is available in the conFuse image repository (e.g., the docker registry 222).

In the conFuse controller, the image can be pulled from the registry, at 226. Upon or after pulling the image, a determination can be made related to what is to be performed with respect to the image (e.g., what should be configured in the image). Since the entry point for the functions potentially are not known, a docket history can be inspected, at 228. The docket history can provide data related to how the image was built and what was intended to be running inside that image. The docket history can be available as metadata in the image. Thus, if the docket image is available, how the image is to be run is part of the metadata of that image. Therefore, the image can be inspected. The inspect docket can be using the information (e.g., how that image is to be run, how executed, and so on). For example, the new image can be pulled to conFuse platform. Thus, a docker history of the image can be created. The docker history can be collected from the image to identify a command (CMD) or ENTRYPOINT label, for example. According to some implementations, these labels can be used to designate the main executable file inside the image.

Upon or after determining the information, the image can be flattened, at 230. For example, the image could have multiple layers, but because in conFuse a single layer should be available for the overlay, all the layers in the image can be flattened to create a single layer. For example, docker images can be managed as different layers. Thus, on the conFuse platform, the extension image can be flattened to a single layer (e.g., a single filesystem directory). For "scratch" images, the files inside the images can be copied into respective runtime directories.

Further, at 232, the extension entrypoint can be set and/or updated. For example, a special file ".entrypoint" can be created in the extension directory that can store the main executable script and their parameters. The encapsulated security application can be applied to a simulated system state of a computing device during subsequent scanning operations, as indicated at 234. Results of respective analytics for scanning operations of the subsequent scanning operations can be stored at 236.

Figure 3:
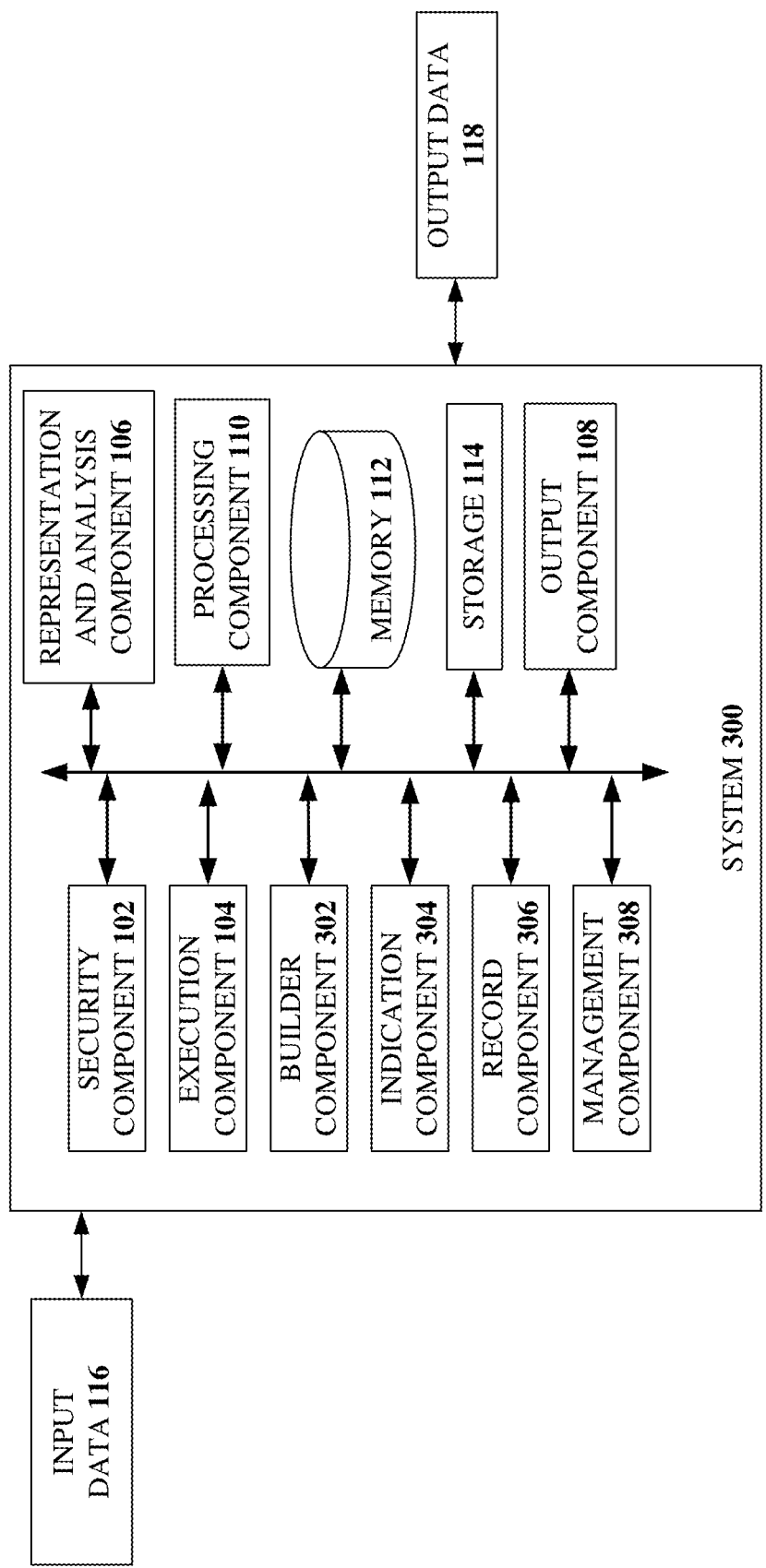
FIG. 3 illustrates a block diagram of an example, non-limiting, system that facilitates creation and notification of security applications in accordance with one or more embodiments described herein

FIG. 3 illustrates a block diagram of an example, non-limiting, system 300 that facilitates creation and notification of security applications in accordance with one or more embodiments described herein. Repetitive description of like elements employed in other embodiments described herein is omitted for sake of brevity.

The system 300 can comprise one or more of the components and/or functionality of the system 100, the system 200, and vice versa. The system 300 can comprise a builder component 302 that can create an encapsulated security application based on deployment of a security application onto an image. For example, the image can be a combination of a file system for the security application and parameters associated with the security application. According to some implementations, the image can comprise executable script.

Further, the system 300 can comprise a storage component (e.g., the storage 114 or another system component) that can maintain an image repository for the image. In addition, the storage component (e.g., the storage 114) can maintain the image repository for other images associated with other encapsulated security applications.

An indication component 304 can monitor the image repository maintained by the storage component (e.g., the storage 114). Upon or after detection of an image, not previously retained in the image repository, the indication component 304 can provide a notification to the execution component 104. The execution component 104 can apply the instance of the encapsulated security application to a simulated system state of a computing device based, at least in part, on the notification.

According to some implementations, a record component 306 can evaluate a history of the image for a label that designates a main executable file inside the image. The image can be managed in at least two data layers and a management component 308 can flatten the image to a single data layer and can copy the single data layer into a runtime directory.

Figure 4:
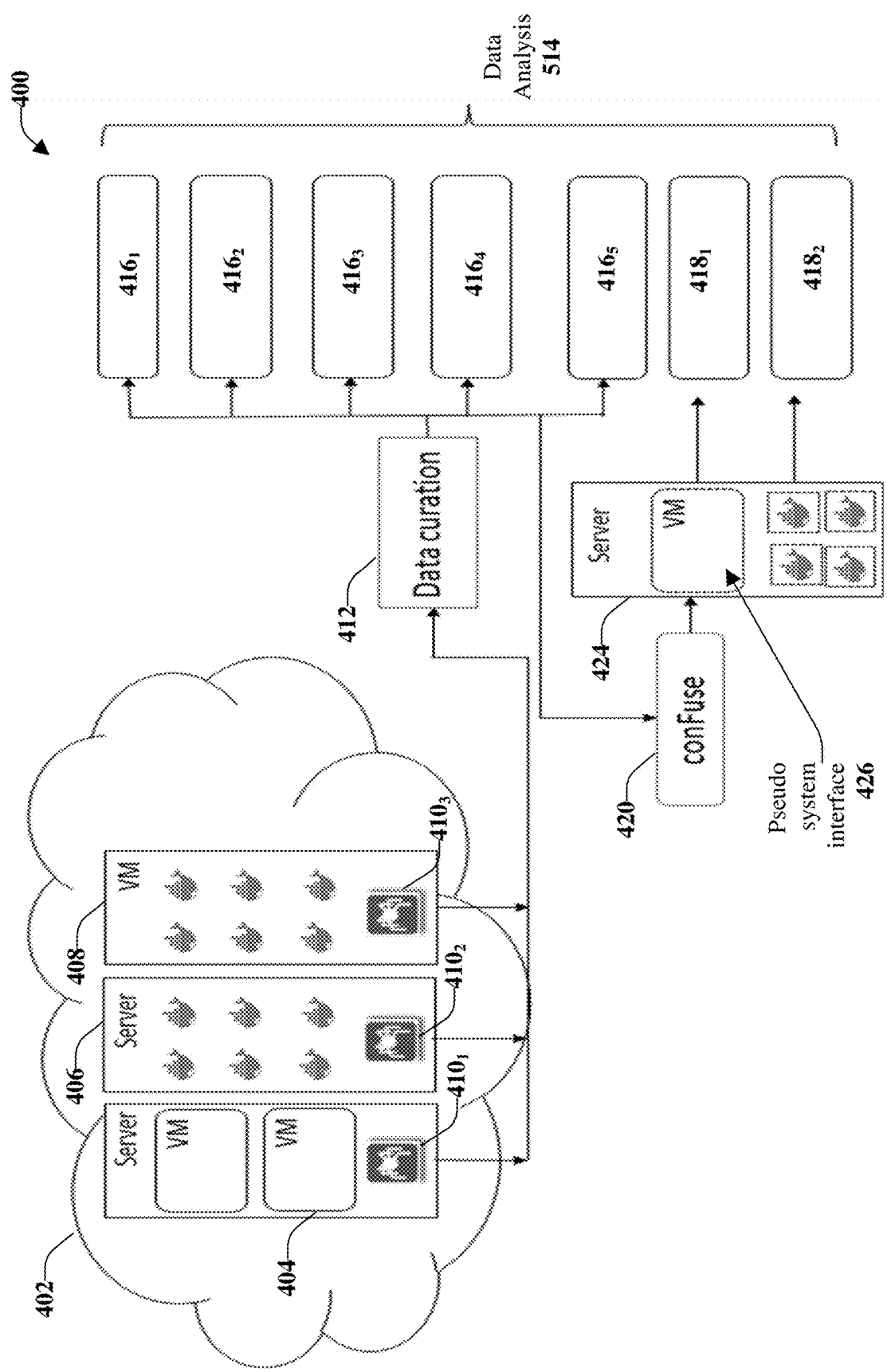
FIG. 4 illustrates an example, non-limiting system for implementation of a pseudo system interface in accordance with one or more embodiments described herein.

FIG. 4 illustrates an example, non-limiting, system 400 for implementation of a pseudo system interface in accordance with one or more embodiments described herein. Repetitive description of like elements employed in other embodiments described herein is omitted for sake of brevity.

The system 400 can comprise one or more of the components and/or functionality of the system 100, the system 200, the system 300, and vice versa. The system 400 can separate a collection portion and an analytics portion of a cloud computing device as discussed herein. As illustrated, one or more systems can be executed in a cloud computing environment 402. For example, the one or more systems can be servers (e.g., a first server 404 and a second server 406) and/or virtual machines (e.g., VM 408). By way of example and not limitation, the first server 404 can be running two virtual machines, as illustrated in FIG. 4. However, it should be noted that other implementations can be utilized in addition to the specific implementation shown and described.

Instead of running tools inside the system, respective data gathering components (e.g., data collection devices $410_1$, $410_2$, $410_3$) can collect information about the associated system and can create a set of system characters (e.g., a detailed list of the system). The data can be retained in a document, according to an aspect. The various aspects provided herein can operate based on the context of the gathered data. The data collection can be utilized to gather metrics, files, and other information.

For example, a data curation component 412 can work against the data (not directly in the one or more systems located in the cloud computing environment 402). At the level of the data curation component 412, various tools can be implemented (e.g., malware, compliance analysis tools). The data curation component 412 can evaluate the data extracted and update the document with the information available.

For example, as illustrated the data analytics 414 can be moved out the system(s) located in the cloud computing environment 402 and can be converted into data. For example, one or more tools can be non-legacy applications (e.g., non-legacy applications $416_1$ through $416_5$). Further, one or more tools can be legacy tools (e.g., legacy applications $418_1$ and $418_2$) included in the data analytics 414.

Prior to implementation of the disclosed aspects, the legacy applications $418_1$ and $418_2$ were not usable. For example, legacy applications (or legacy tools) were designed and developed to run directly on the compute entity (e.g., servers, VMs) in the cloud computing environment 402. Traditionally the system state can be modeled and presented as a filesystem (e.g., /proc, /sys, root filesystem). Thus, legacy tools inherently expect a standard portable operating system interface (POSIX) compliant interface and use this interface as a read-only filesystem. Running legacy tools locally implies performance overhead and security concerns limiting compute-intensive machine learning driven analytics. This can also limit the scope of analytics since global view of system/cloud are not available.

Thus, according to various aspects, provided are data collection and analytics that can be separated so that analytics capability can scale independently of data collection. Further, the various aspects can enable a global view and data correlation through centralized data curation. In addition, a system state can be decoupled from the system and can be available as a streaming data and not as a standard POSIX interface. Further, the various aspects can be implemented without re-writing the analytics tools to a new system model. In addition, the legacy applications (Security Content Automation Protocol (SCAP), openScap, security information and event management (IEM), antivirus) can be ported to the new system model.

For example, as discussed herein, the representation and analysis component 106 can be implemented. According to some implementations, the representation and analysis component 106 can be referred to as a retrospective cloud computing introspection component or as conFuse (File System in User Space (Fuse) for a Container (con)). Through implementation of the representation and analysis component 106, the computing system can be converted to data, and back to a computing system. After conversion from the data to the computing system, the computing system can be implemented, for example, on a server 424 that can comprise a pseudo system interface 426 or a pseudo system state (illustrated as being implemented on a virtual machine).

The pseudo system interface 426 can mimic a container, for example. Thus, the pseudo system interface 426 can appear and operate as a computing system to the legacy applications $418_1$ and $418_2$, for example, but on the back end (e.g., behind the scenes) the pseudo system interface 426 can be working against the data. Accordingly, the aspects discussed herein can be utilized with both legacy applications and new, emerging applications.

According to some implementations, the system 400 can recreate a pseudo system interface using a conFuse component 420 (e.g., the representation and analysis component 106) for servers, VMs, and containers. Further, legacy applications can be run (e.g., executed) without modifications. In addition, the system 400 can provide a black-box analytics platform for existing and new applications. The system 400 can also be useful as a stand-alone and isolated test-platform for testing new system analytics features, according to an implementation.

As discussed herein, the various aspects can convert files systems code into codes against the data. In a specific, non-limiting example, some systems (e.g., Linux systems) can expose its operating states through read-only pseudo filesystems, such as, for example: procfs (/proc), which can be process information (e.g., process running information), and sysfs (/sys), which can be kernel subsystem, device drivers, and/or hardware devices (e.g., configuration of the operating system). Further, the one or more compute entities (e.g., VM, container) can also have respective persistent states in respective "root filesystems" (/etc, /home, /usr . . . ). Data collectors can capture these states and transform the states into standard formatted data, which are sometimes referred to as crawler-frames. The frames can be transported over the network to separate analytic platforms. In an example, the frames can be a general representation of data (e.g., how the systems are represented as data) and can be in any data representation format.

By way of example and not limitation, the following in an example sample frame that can be utilized. However, the disclosed aspects are not limited to the following example.

os "linux" {"boottime":1490040337.0,"uptime": 614100.0,"ipaddr":["127.0.0.17172.16.73.76"],"os": "ubuntu","os_version":"16.04","os_kernel":"Linux-4.4.0-53-generic-x86_64-with-debian-stretch-sid", "architecture":"x86_64"} . . . .

disk "/" {"partitionname":" ","freepct":90.7,"fstype": "aufs","mountpt":"/","mountopts": "rw,relatime, si=f2ed3824d9539b5c,dio,dirperm1","partitionsize": 105389207552} . . . .

package "debianutils" {"installed":null,"pkgname":"debianutils","pkgsize":"213","pkgversion":"4.7", "pkgarchitecture":"amd64"} . . . .

file "/etc/host.conf" {"atime":1445534121.0,"ctime": 1488853389.4237413,"gid":0,"linksto":null,"mode": 33188,"mtime":1445534121.0,"name":"host.conf", "path":"/etc/host.conf", "size":92,"type":"file","uid": 0} . . . .

process "python/14" {"cmd":"python crawler. py . . . } . . . .

. . . .

Figure 5:
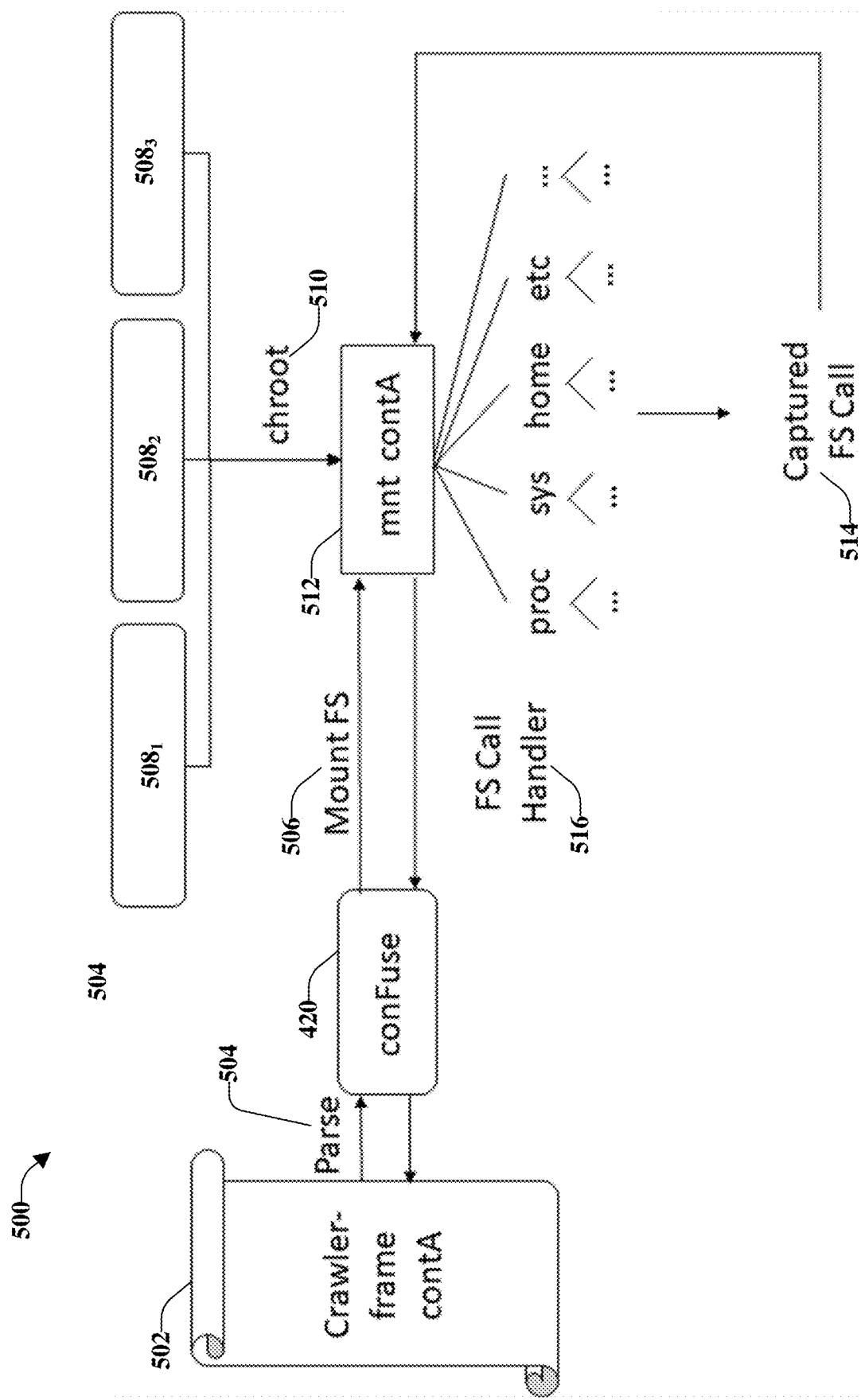
FIG. 5 illustrates an example, non-limiting system of an architecture for a conFuse component in accordance with one or more embodiments described herein.

FIG. 5 illustrates an example, non-limiting, system 500 of an architecture for a conFuse component in accordance with one or more embodiments described herein. Repetitive description of like elements employed in other embodiments described herein is omitted for sake of brevity.

The system 500 can comprise one or more of the components and/or functionality of the system 100, the system 200, the system 300, and/or the system 400, and vice versa. Illustrated on the left of FIG. 5 is a data representation of a system, which is referred to as a data collection device frame 502. For example, the data collection device frame 502 is referred to as crawler-frame contA (e.g., the crawler frame for Container A). The system state frame data can be collected from a container, Virtual Machine, bare metal, laptop, and so on.

Each data collection device frame of container/VM (e.g., the data collection device frame 502) can be parsed, at 504, by the conFuse component 420 (e.g., the representation and analysis component 106, fuse filesystem). Further, a separate mount point (e.g., a directory (which is usually empty) in the currently accessible filesystem on which an additional filesystem can be mounted (e.g., logically attached)) can be created, at 506. For example, the conFuse component 420 can, based on the data collection device frame 502 create a file system view. On top of that can be applications $508_1$, $508_2$, $508_3$. For example, the one or more applications $508_1$, $508_2$, $508_3$ can be built on top of the same file system using various layer file system techniques and using a change root (chroot) of the specific implementation, at 510. For example, legacy applications can chroot to these mount points to view the root-filesystem of the respective container/VM. According to some implementations, the chroot: can be an operating system capability to make the one or more applications operate as if the one or more applications are all in the system and can perform the capturing and implementing of the file system code.

Thus, the one or more applications $508_1$, $508_2$, $508_3$ can appear as if the respective application is installed in the system and is operating on top of the file system 512 (e.g., /mnt/contA). For example, one or more file system layers can be built and selectively added and/or removed from the underlying file system. A process to modify can be to create a base layer (OS) and build additional layers on top of the base layer. The layers in the file system utilize the container A can communicate with the conFuse component 420. On top of that can be additional layers that can comprise the legacy applications, which can function as if they are components of the entire system.

One or more filesystem calls (e.g., open, read, stat, is etc.) made by applications inside mount points, at 514, can be intercepted by a File System in User Space (FUSE) and control can be passed to the conFuse component 420 for handling that call, at 516. The conFuse component 420 can return the related filesystem metadata/data from the parsed frame output (e.g., from 504).

For example, behind the scenes of the filesystem view, all the file system codes can be captured and the conFuse component 420 can execute against the data. Accordingly, there is no system, virtual machine, container, or server running on the mount container A. Further, there is no container A, just an impression that it exists.

Figure 6:
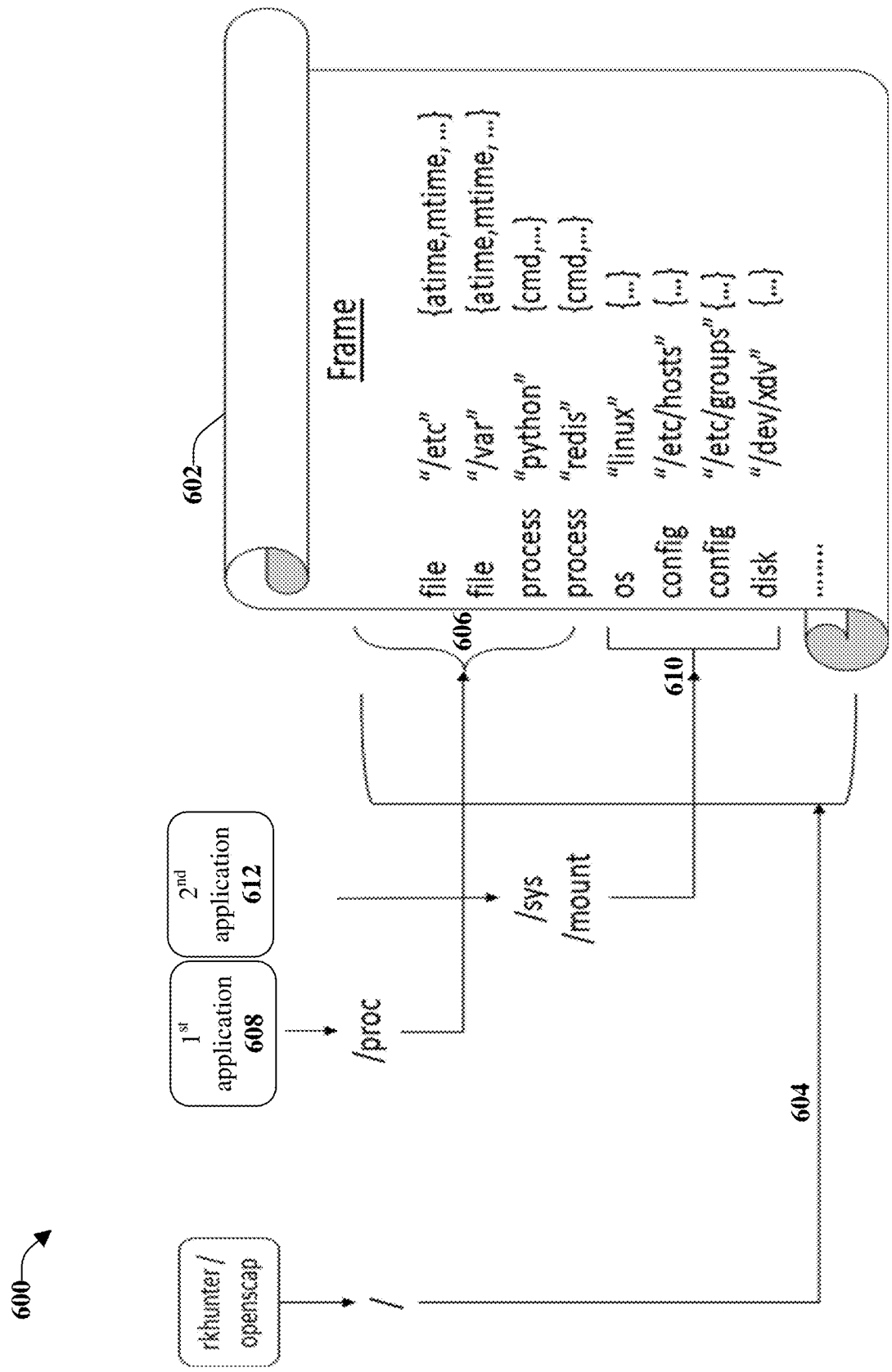
FIG. 6 illustrates an example, non-limiting representation of an internal design of a conFuse component in accordance with one or more embodiments described herein.

FIG. 6 illustrates an example, non-limiting representation of an internal design 600 of a conFuse component in accordance with one or more embodiments described herein. Illustrated is a frame 602 (e.g., the data collection device frame 502). The one or more applications (e.g., Openscap Trace) can be installed in slash (e.g., in the root directory), as indicated at 604. Various elements of the data 604 can be evaluated (e.g., file information, process information, operating system (OS) information, configuration (config) information, and disk information). As illustrated, different pieces of logic can be mapped into the file system. For example, a first set of logic 606 can be mapped to a first application 608 and a second set of logic 610 can be mapped to a second application 612.

According to some implementations, an application built can be "Openscap," which can be used for compliance analysis. As a non-limiting example, codes used for Openscap were analyzed and it was determined that only a subset of the codes (e.g., a small portion) needed to be implemented with the disclose aspects. Thus, codes that do not need to be implemented, such as codes that change the file system, are not implemented, which can improve efficiencies of a computing system as discussed herein.

Figure 7:
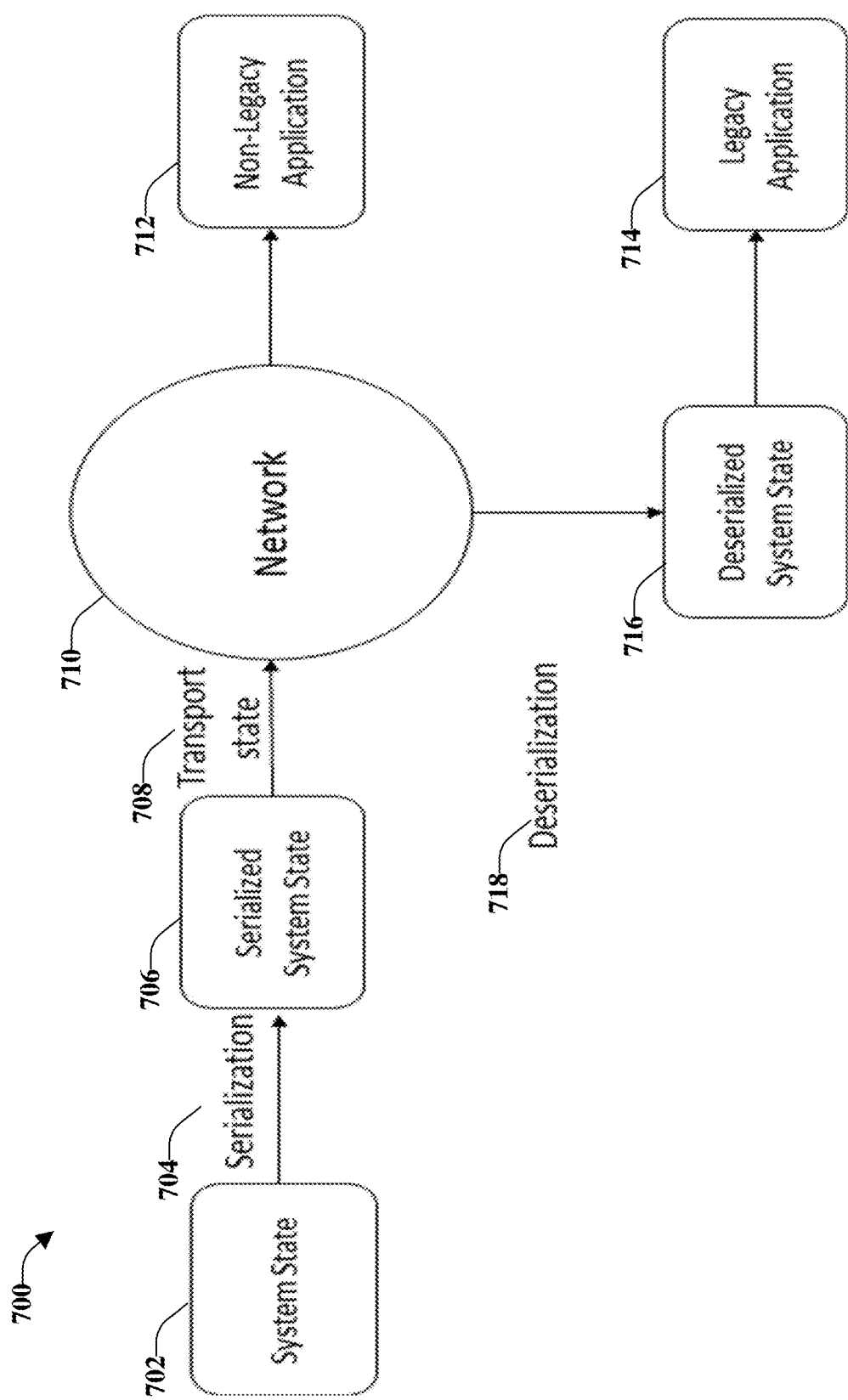
FIG. 7 illustrates an example, non-limiting system for serialization in accordance with one or more embodiments described herein.

FIG. 7 illustrates an example, non-limiting, system 700 for serialization in accordance with one or more embodiments described herein. The system 700 can comprise one or more of the components and/or functionality of the system 100, the system 200, the system 300, the system 400, and/or the system 500, and vice versa.

Starting with a system state 702, serialization can be performed at 704. As discussed herein, serialization refers to extracting the system state 702 and representing the system state 702 in a different format (e.g., a serialized system state 706), which can be a binary format or another format. The serialized system state 706 can be transported 708 over a network 710.

As illustrated, non-legacy applications 712 can operate directly with the system state over the network 710. However, for legacy applications 714, a deserialized system state 716 should be created, such as through deserialization 718 as discussed herein. Accordingly, the non-legacy applications 712 and the legacy applications 714, in some implementations, are not located together.

Figure 8:
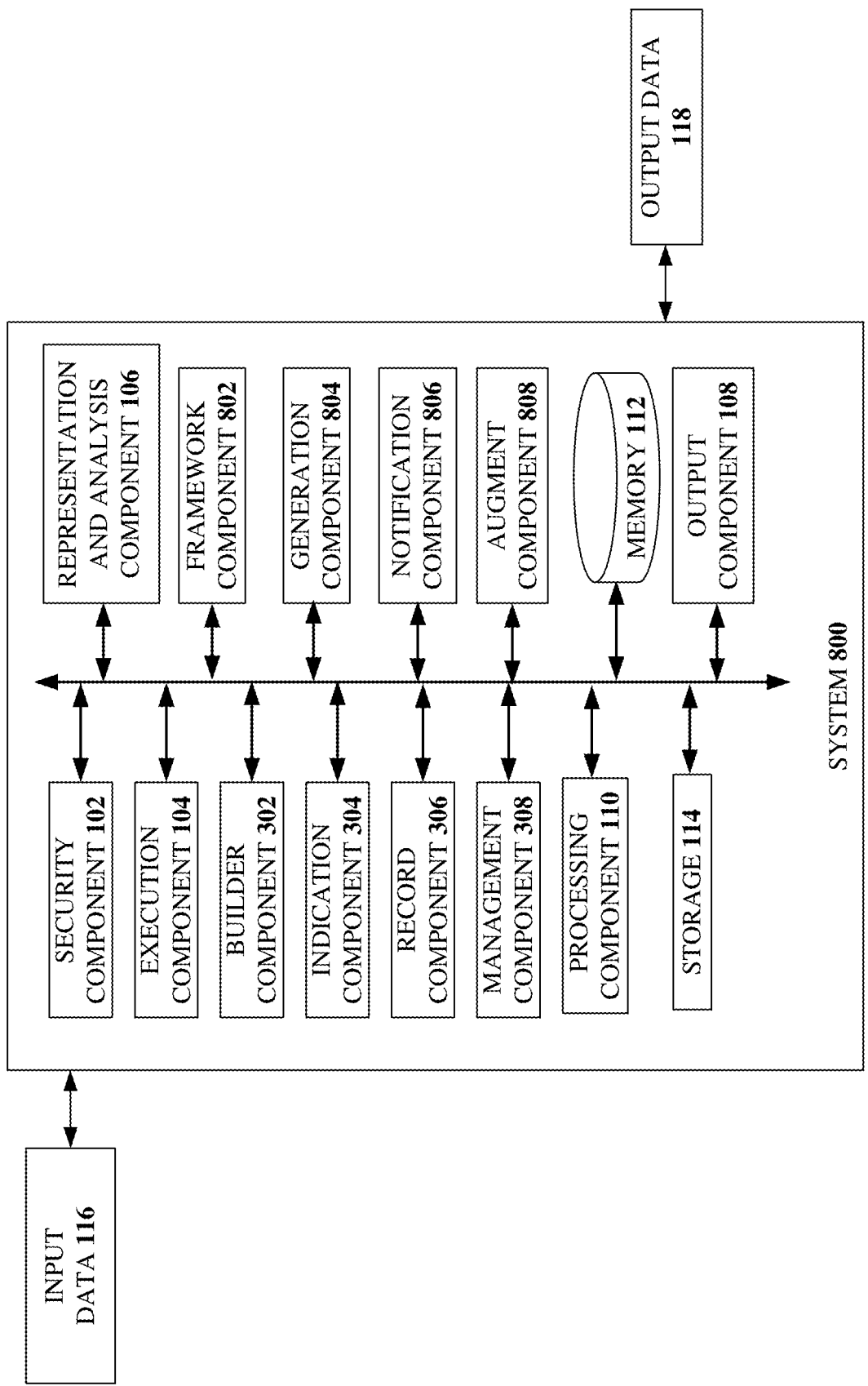
FIG. 8 illustrates an example, non-limiting system for event creation and notification in accordance with one or more embodiments described herein.

FIG. 8 illustrates an example, non-limiting, system 800 for event creation and notification in accordance with one or more embodiments described herein. Repetitive description of like elements employed in other embodiments described herein is omitted for sake of brevity.

The system 800 can comprise one or more of the components and/or functionality of the system 100, the system 200, the system 300, the system 400, the system 500, and/or the system 700, and vice versa. The system 800 can comprise a framework component 802 that can receive, as the input data 116, a system state of a computing device. The system state can be an original computing state of the computing device. The computing device can be a server, a virtual machine, or other computing device configured to facilitate operation of a cloud-computing environment. Based on the input data 116, the framework component 802 can recreate a system state of the computing device as a pseudo system state for the computing device. For example, the pseudo system state can be decoupled from an original operating state of the computing device. Further, the pseudo system state can comprise data abstracted from the original operating state. The data abstracted can mimic an operation of the computing device.

A generation component 804 can create the pseudo system state and can facilitate black-box execution of software over the pseudo system state. For example, the black-box execution of the software can comprise running applications in the pseudo system state as if the applications were executing in the original operating state of the computing device. The output component 108 can render the pseudo system state as output data 118. For example, the output component 108 can render the pseudo system state via an interface that can be in compliance with a portable operating system interface protocol.

For example, data related to the original operating state of the computing device can be transformed into a document format, rather than a system format. When various applications or software (e.g., legacy applications/software, non-legacy applications/software, emerging applications/software) are to be executed, the various applications/software can appear to be executing within the computing device. However, the applications/software are actually executing from the document.

According to some implementations, the framework component 802 can retrospectively create the pseudo system state from the system state of the computing device. Based on the retrospective creation of the pseudo system state, the framework component 802 (and other system components) can increase a processing efficiency of the system without installation of software applications on the computing device.

In accordance with some implementations, the computing device can be a first computing device and the pseudo system state can be a first pseudo system state. Further to these implementations, the framework component can create a global view of the first pseudo system state and at least a second pseudo state across computing resources. The computing resources can comprise the first computing device and at least the second computing device.

According to some implementations, the system 800 can comprise a notification component 806 that can generate one or more event notifications in response to the pseudo system state. The one or more event notifications can be decoupled from the original operating state of the computing device.

Further, the system 800 can comprise an augment component 808 that can create one or more updated pseudo system states for the computing device. The notification component 806 can generate an event notification of the one or more event notifications in response to the one or more updated pseudo system states.

As discussed herein, the system 800 can provide a framework to retrospectively recreate a pseudo system state for one or more cloud compute entity devices (e.g., VM, containers). Further, the pseudo system state can be POSIX-compliant, which is a set of standards that have been specified for maintaining compatibility between operating systems. For example, POSIX can define an application programming interface (API) and other interfaces for software compatibility with one or more operating systems.

As discussed herein, the system can continually or continually update the pseudo state. Thus, solutions can be created and can change over time. Further, one or more event notification capabilities can be created. For example, auditd and/or inotify can be utilized with the disclosed aspects. In an example, the various aspects can operate across a variety of computing devices. For example, the framework can provide the ability to create a global or aggregate view across all cloud resources to facilitate new cloud-scale analytics. Thus, when something changes in one computing device, the other computing devices can be analyzed to determine if changes should be applied there also (e.g., aggregate view, global view).

According to some implementations, one or more crawler frames (e.g., data collected) can change continually or continually as system state changes. The various aspects can capture these changes and can enable out-of-band event generation which can be semantically equivalent to: auditd: syscall tracing and/or inotify: capturing filesystem modifications. These events can be used to capture undesirable changes and drive various policies, such as access violation and notification.

Figure 9:
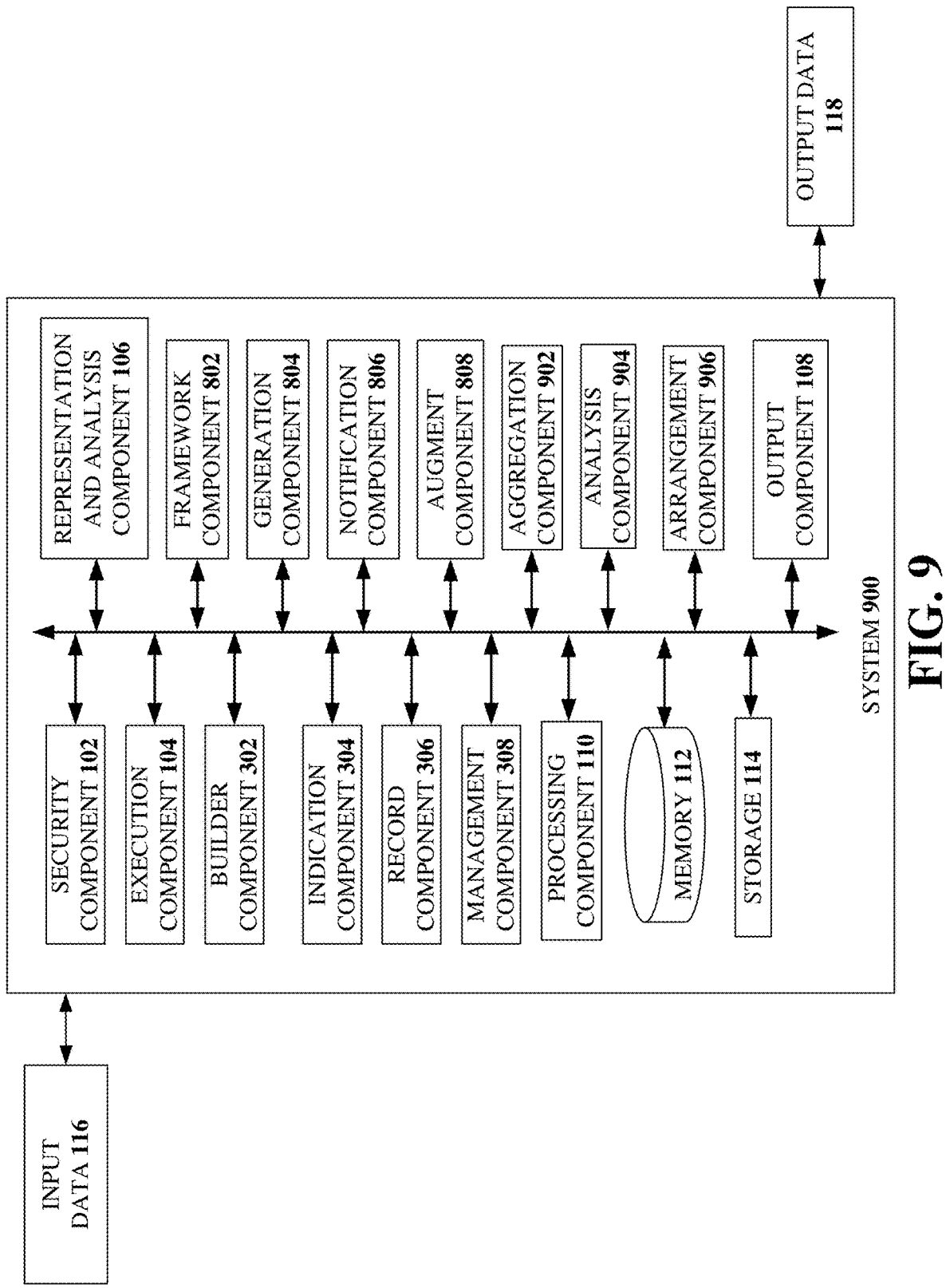
FIG. 9 illustrates an example, non-limiting system for aggregating data in accordance with one or more embodiments described herein.

FIG. 9 illustrates an example, non-limiting, system 900 for aggregating data in accordance with one or more embodiments described herein. Repetitive description of like elements employed in other embodiments described herein is omitted for sake of brevity.

The system 900 can comprise one or more of the components and/or functionality of the system 100, the system 200, the system 300, the system 400, the system 500, the system 700, and/or the system 800, and vice versa. As illustrated, the system 900 can comprise an aggregation component 902 that can accumulate data associated with the system state of the computing device. For example, the aggregation component 902 can retain information related to the system state data, as well as information related to data from other system states. Further, the data can be retained as historical data that can be utilized to evaluate related systems, for example.

Further, an analysis component 904 can gather one or more analytics related to the system state of the computing device. The one or more analytics can be gathered by the analysis component 904 independent of the data accumulated by the aggregation component 902. Further, the framework component 802 can incorporate the data and the one or more analytics into the pseudo system state.

According to some implementations, the system 900 can comprise an arrangement component 906 that can enable multiplexing of applications and software over multiple instances of system devices, including the computing device.

In certain embodiments, the framework component 802 can recreate the system state and/or the generation component 804 can create the pseudo system state based on classifications, correlations, inferences and/or expressions associated with principles of artificial intelligence. For instance, the framework component 802, the generation component 804, as well as other system components, can employ an automatic classification system and/or an automatic classification process to determine sets of logic of various applications that should be utilized and other sets of logic of the various applications that can be selectively ignored for the pseudo system state. In one example, the framework component 802 and/or the generation component 804 can employ a probabilistic and/or statistical-based analysis (e.g., factoring into the analysis utilities and costs) to learn and/or generate inferences with respect to the respective logic of the one or more applications and corresponding features that should be applied to the pseudo system state. In an aspect, the framework component 802 and/or the generation component 804 can comprise respective inference components (not shown) that can further enhance automated aspects of the framework component 802 and/or the generation component 804 utilizing in part inference based procedures to facilitate learning and/or generating inferences associated with the logic that should be applied in order to achieve a properly functioning pseudo system state. The framework component 802 and/or the generation component 804 can employ any suitable machine-learning based techniques, statistical-based techniques and/or probabilistic-based techniques. For example, the framework component 802 and/or the generation component 804 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the framework component 802 and/or the generation component 804 can perform a set of machine learning computations associated with generation of the pseudo system state. For example, the framework component 802 and/or the generation component 804 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to create the pseudo system state.

As discussed herein, provided is a system and accompanying methods that allows for the building and dynamic implementation of new security applications for cloud systems. Cloud system embodies containers, such as virtual machines (VMs), Bare-Metal Servers (BMSs) or any other type of instance which can be observed, and data can be extracted from.

According to some implementations, instead of installing new application onto running systems, the application can be encapsulated into standard docker images and upload to docker registry. For example, a single application instance can be applied to all cloud systems. The extension applications can be easily upgraded, modified, and/or removed without touching running cloud systems and thus largely reducing maintenance overhead. In some implementations, the extension applications can sandboxed through kernel security features to enforce security.

Figure 10:
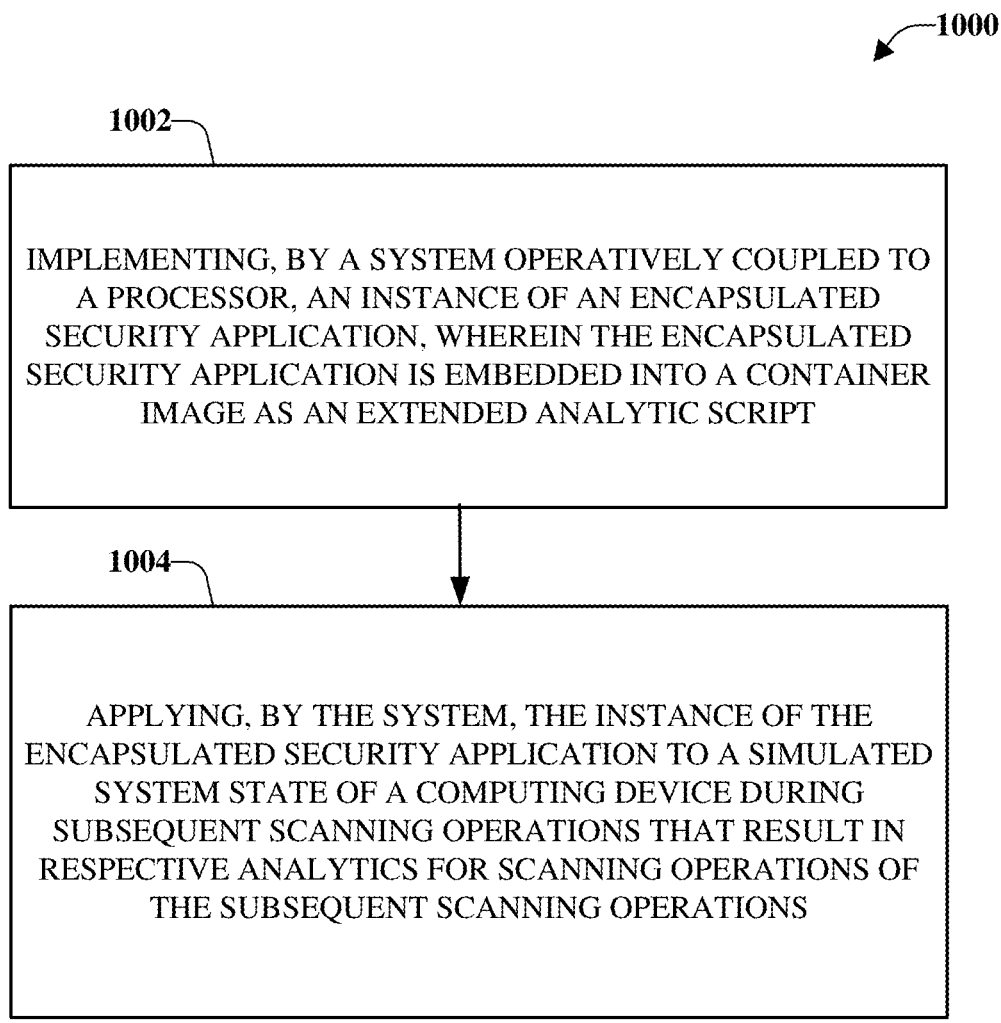
FIG. 10 illustrates a flow diagram of an example, non-limiting, computer-implemented method that facilitates cloud-native extensibility provided to security analytics in accordance with one or more embodiments described herein.

FIG. 10 illustrates a flow diagram of an example, non-limiting, computer-implemented method 1000 that facilitates cloud-native extensibility provided to security analytics in accordance with one or more embodiments described herein. Repetitive description of like elements employed in other embodiments described herein is omitted for sake of brevity.

At 1002 of the computer-implemented method 1000, a system operatively coupled to a processor can implement an instance of an encapsulated security application (e.g., via the security component 102). The encapsulated security application can be embedded into a container image as an extended analytic script.

Further, at 1004 of the computer-implemented method 1000, the instance of the encapsulated security application can be applied to a simulated system state of a computing device during subsequent scanning operations that result in respective analytics for scanning operations of the subsequent scanning operations (e.g., via the execution component 104).

According to some implementations, the simulated system state can be decoupled from an original operating state of the computing device. Further, the simulated system state can comprise data abstracted from the original operating state. The data abstracted can represent an operation of the computing device.

Figure 11:
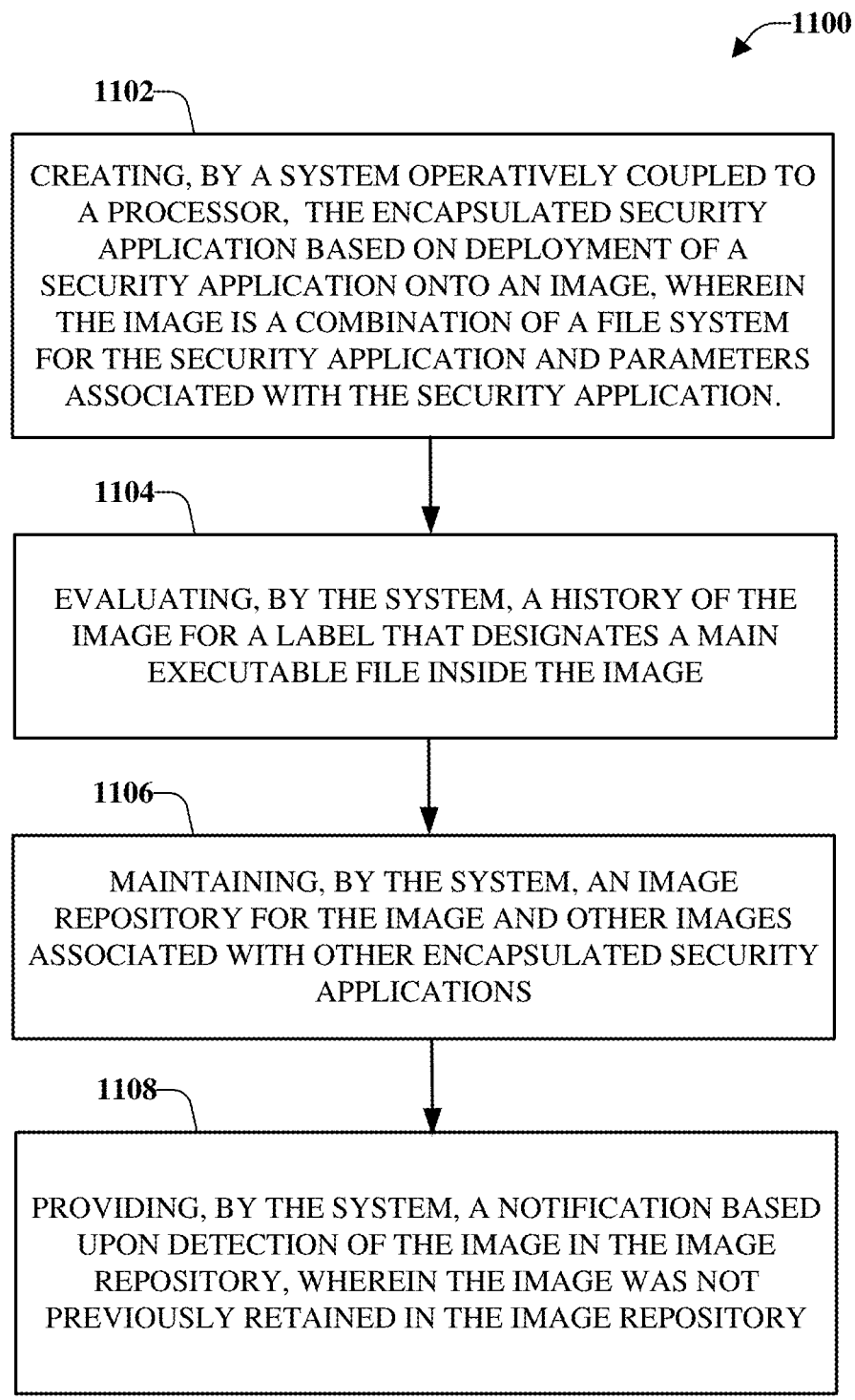
FIG. 11 illustrates a flow diagram of an example, non-limiting, computer-implemented method that facilitates creation of an encapsulated security application and notification of the same in accordance with one or more embodiments described herein.

FIG. 11 illustrates a flow diagram of an example, non-limiting, computer-implemented method 1100 that facilitates creation of an encapsulated security application and notification of the same in accordance with one or more embodiments described herein. Repetitive description of like elements employed in other embodiments described herein is omitted for sake of brevity.

At 1102 of the computer-implemented method 1100, a system operatively coupled to a processor can create an encapsulated security application based on deployment of a security application onto an image (e.g., via the builder component 302). The image can be a combination of a file system for the security application and parameters associated with the security application.

According to some implementations, a history of the image can be evaluated by the system, at 1104, for a label that designates a main executable file inside the image (e.g., via the record component 306). An image repository can be maintained by the system, at 1106, for the image and other images associated with other encapsulated security applications (e.g., via the docker registry 222). Further, at 1108, the system can provide a notification based upon detection of the image in the image repository (e.g., via the indication component 304). The notification can be provided based on a determination that the image was not previously retained in the image repository.

Figure 12:
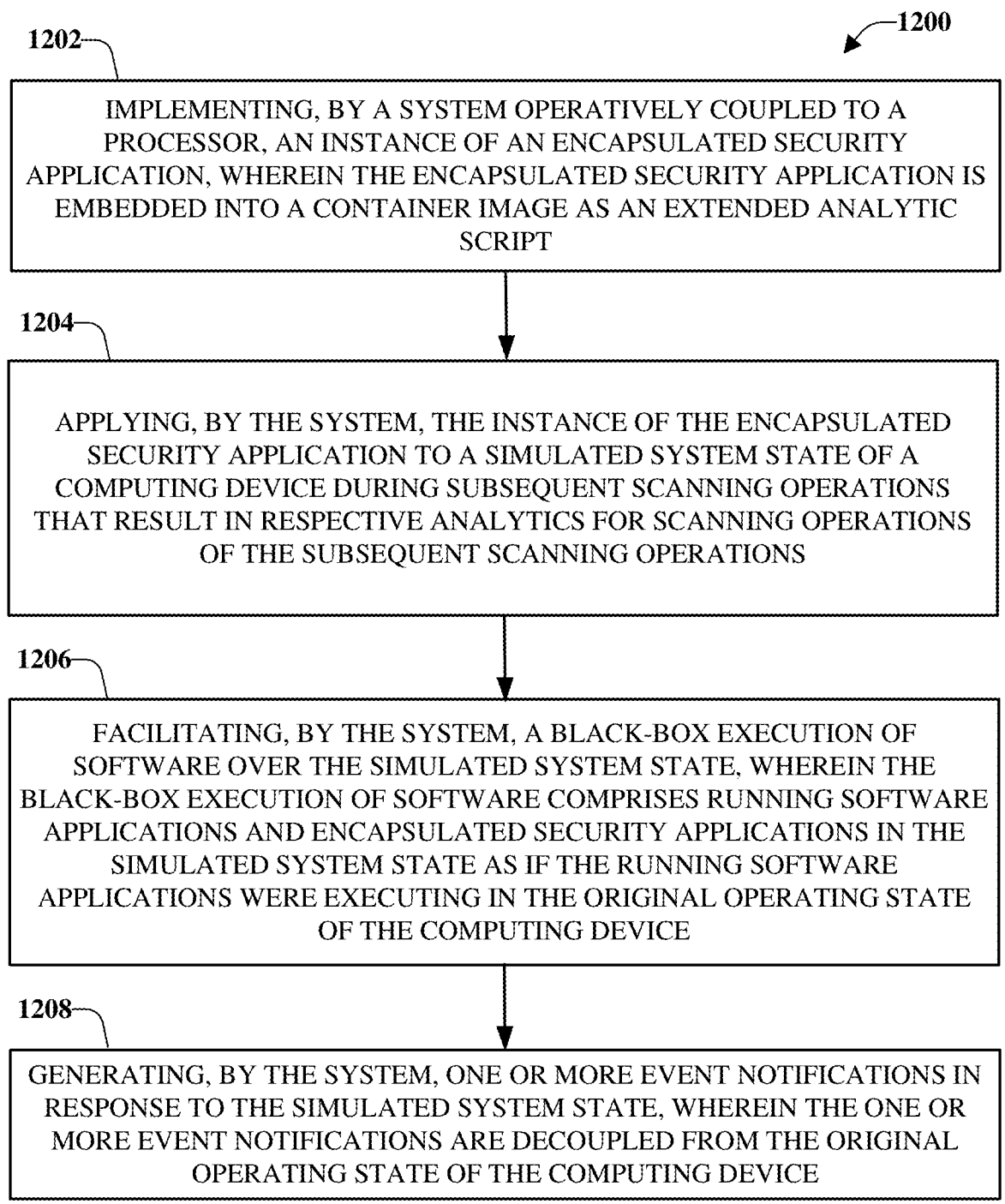
FIG. 12 illustrates a flow diagram of an example, non-limiting, computer-implemented method that facilitates event generation and notification in accordance with one or more embodiments described herein.

FIG. 12 illustrates a flow diagram of an example, non-limiting, computer-implemented method 1200 that facilitates event generation and notification in accordance with one or more embodiments described herein. Repetitive description of like elements employed in other embodiments described herein is omitted for sake of brevity.

At 1202 of the computer-implemented method 1200, a system operatively coupled to a processor can implement an instance of an encapsulated security application (e.g., via the security component 102). The encapsulated security application can be embedded into a container image as an extended analytic script.

Further, at 1204 of the computer-implemented method 1200, the instance of the encapsulated security application can be applied to a simulated system state of a computing device during subsequent scanning operations that result in respective analytics for scanning operations of the subsequent scanning operations (e.g., via the execution component 104).

In accordance with some implementations, the simulated system state can be decoupled from an original operating state of the computing device. Further, the simulated system state can comprise data abstracted from the original operating state. The data abstracted can represent an operation of the computing device.

The system can facilitate, at 1206, a black-box execution of software over the simulated system state (e.g., via the indication component 304). The black-box execution of software can comprise running software applications and encapsulated security applications in the simulated system state as if the running software applications were executing in the original operating state of the computing device.

Further, in some implementations, at 1208, one or more event notifications can be generated by the system in response to the simulated system state (e.g., via the notification component 806). The one or more event notifications can be decoupled from the original operating state of the computing device (e.g., can be executed with the simulated system state).

The system state of the computing device can be an original operating state of the computing device. The simulated system state can be decoupled from the original operating state of the computing device and can comprise data abstracted from the original operating state. Further, the data abstracted can mimic an operation of the computing device. A processing efficiency of the system, therefore, can be increased without installation of software applications on the computing device.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 13:
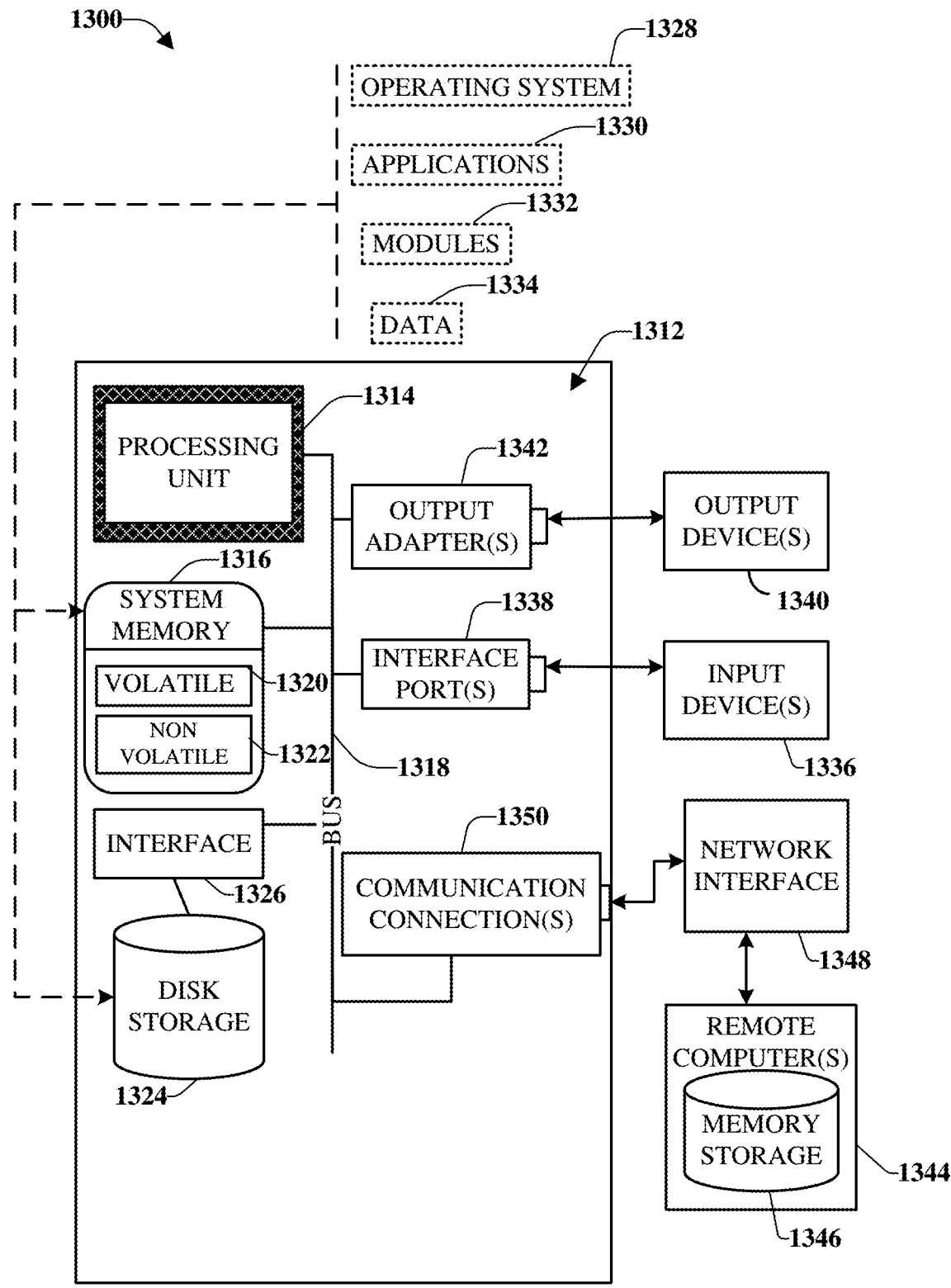
FIG. 13 illustrates a block diagram of an example, non-limiting operating environment in which one or more embodiments described herein can be facilitated.

In order to provide a context for the various aspects of the disclosed subject matter, FIG. 13 as well as the following discussion are intended to provide a general description of a suitable environment in which the various aspects of the disclosed subject matter can be implemented. FIG. 13 illustrates a block diagram of an example, non-limiting operating environment in which one or more embodiments described herein can be facilitated. Repetitive description of like elements employed in other embodiments described herein is omitted for sake of brevity. With reference to FIG. 13, a suitable operating environment 1300 for implementing various aspects of this disclosure can also include a computer 1312. The computer 1312 can also include a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314. The system bus 1318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1316 can also include volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM)). Volatile memory 1320 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1312 can also include removable/non-removable, volatile/nonvolatile computer storage media. FIG. 13 illustrates, for example, a disk storage 1324. Disk storage 1324 can also include, but is not limited to, devices like a magnetic disk drive, floppy disk drive, tape drive, Jaz drive, Zip drive, LS-100 drive, flash memory card, or memory stick. The disk storage 1324 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1324 to the system bus 1318, a removable or non-removable interface is typically used, such as interface 1326. FIG. 13 also depicts software that acts as an intermediary between users and the basic computer resources described in the suitable operating environment 1300. Such software can also include, for example, an operating system 1328. Operating system 1328, which can be stored on disk storage 1324, acts to control and allocate resources of the computer 1312. System applications 1330 take advantage of the management of resources by operating system 1328 through program modules 1332 and program data 1334, e.g., stored either in system memory 1316 or on disk storage 1324. It is to be appreciated that this disclosure can be implemented with various operating systems or combinations of operating systems. A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port can be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a method of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a computer, a server, a router, a network PC, a workstation, a microprocessor based appliance, a peer device or other common network node and the like, and typically can also include many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1350 refers to the hardware/software employed to connect the network interface 1348 to the system bus 1318. While communication connection 1350 is shown for illustrative clarity inside computer 1312, it can also be external to computer 1312. The hardware/software for connection to the network interface 1348 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create method for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. The characteristics are as follows: on-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a high level of abstraction (e.g., country, state, or data center). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows: Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of selected networking components (e.g., host firewalls).

Deployment Models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 14:
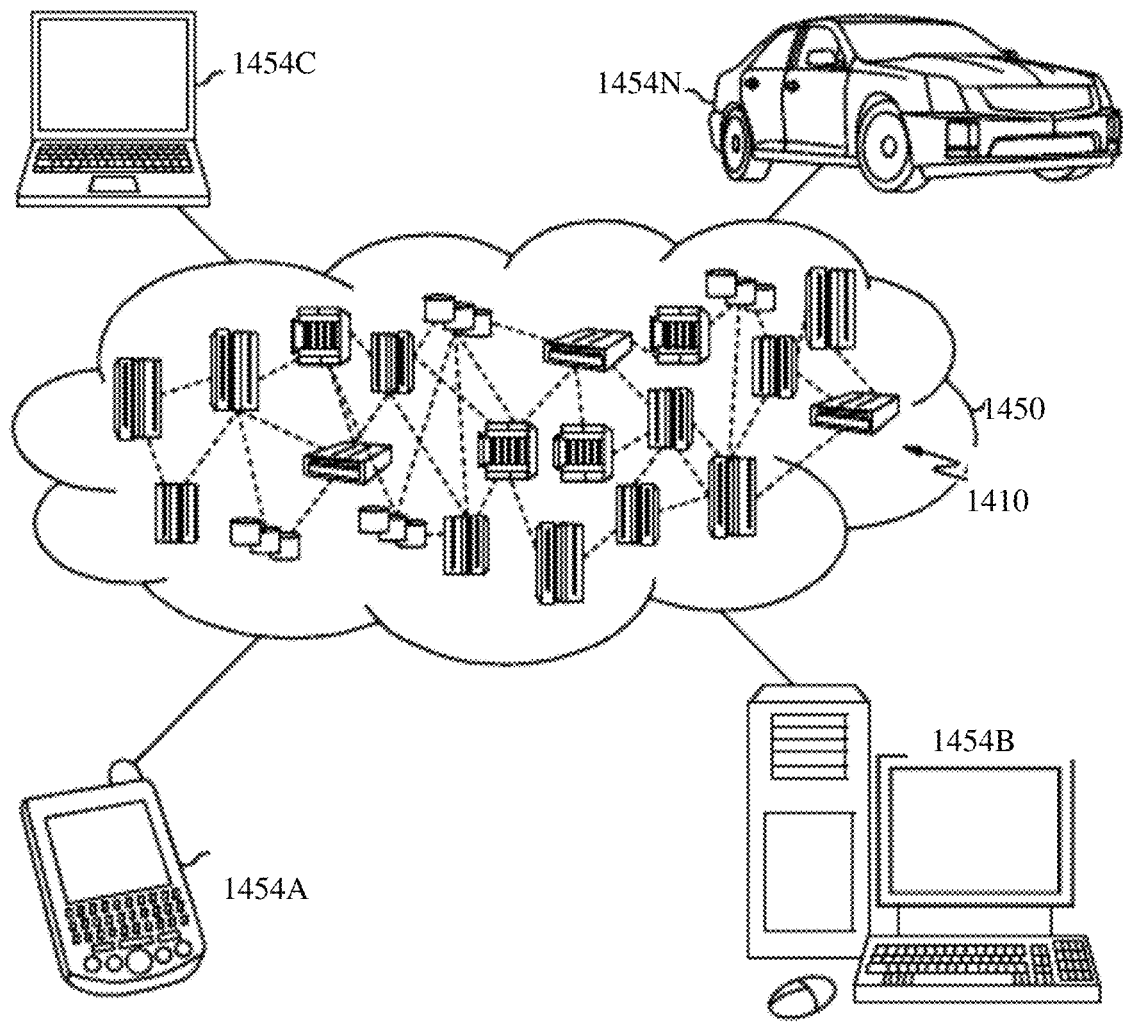
FIG. 14 depicts a cloud computing environment in accordance with one or more embodiments described herein.

Referring now to FIG. 14, illustrative cloud computing environment 1450 is depicted. As shown, cloud computing environment 1450 includes one or more cloud computing nodes 1410 with which local computing devices used by cloud consumers, such as, for example, personal digital assistant (PDA) or cellular telephone 1454A, desktop computer 1454B, laptop computer 1454C, and/or automobile computer system 1454N may communicate. Nodes 1410 may communicate with one another. They may be grouped (not shown) physically or virtually, in one or more networks, such as Private, Community, Public, or Hybrid clouds as described hereinabove, or a combination thereof. This allows cloud computing environment 1450 to offer infrastructure, platforms and/or software as services for which a cloud consumer does not need to maintain resources on a local computing device. It is understood that the types of computing devices 1454A-N shown in FIG. 14 are intended to be illustrative only and that computing nodes 1410 and cloud computing environment 1450 can communicate with any type of computerized device over any type of network and/or network addressable connection (e.g., using a web browser).

Figure 15:
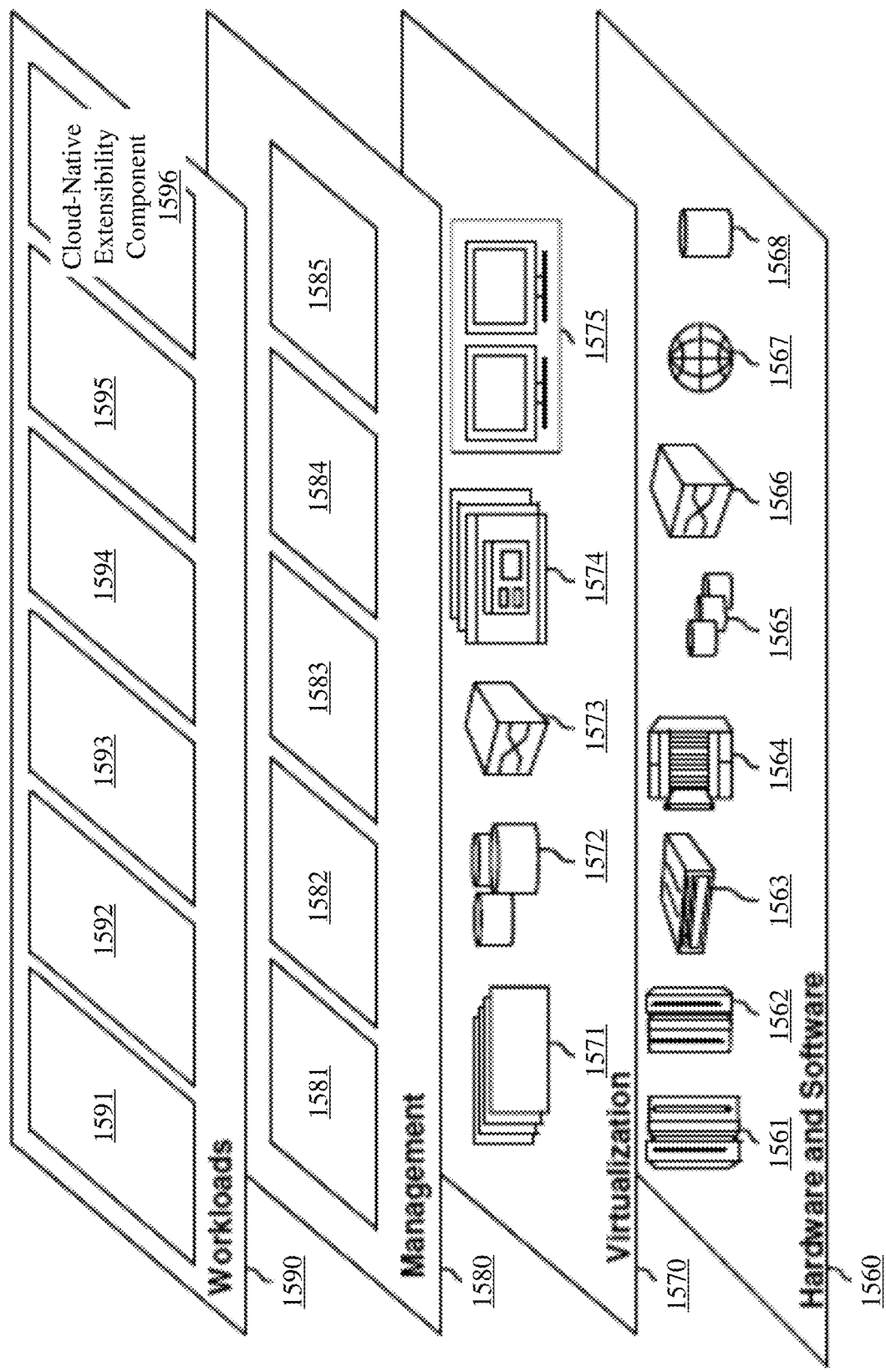
FIG. 15 depicts abstraction model layers in accordance with one or more embodiments described herein.

Referring now to FIG. 15, a set of functional abstraction layers provided by cloud computing environment 1450 (FIG. 14) is shown. It should be understood in advance that the components, layers, and functions shown in FIG. 15 are intended to be illustrative only and embodiments of the invention are not limited thereto. As depicted, the following layers and corresponding functions are provided: Hardware and software layer 1560 includes hardware and software components. Examples of hardware components include: mainframes 1561; RISC (Reduced Instruction Set Computer) architecture based servers 1562; servers 1563; blade servers 1564; storage devices 1565; and networks and networking components 1566. In some embodiments, software components include network application server software 1567 and database software 1568.

Virtualization layer 1570 provides an abstraction layer from which the following examples of virtual entities may be provided: virtual servers 1571; virtual storage 1572; virtual networks 1573, including virtual private networks; virtual applications and operating systems 1574; and virtual clients 1575.

In one example, management layer 1580 may provide the functions described below. Resource provisioning 1581 provides dynamic procurement of computing resources and other resources that are utilized to perform tasks within the cloud computing environment. Metering and Pricing 1582 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1583 provides access to the cloud computing environment for consumers and system administrators. Service level management 1584 provides cloud computing resource allocation and management such that required service levels are met. Service Level Agreement (SLA) planning and fulfillment 1585 provide pre-arrangement for, the procurement of, cloud computing resources for which a future requirement is anticipated in accordance with an SLA.

Workloads layer 1590 provides examples of functionality for which the cloud computing environment may be utilized. Examples of workloads and functions which may be provided from this layer include: mapping and navigation 1591; software development and lifecycle management 1592; virtual classroom education delivery 1593; data analytics processing 1594; transaction processing 1595; and a cloud-native extensibility component 1596.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other method to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A system, comprising:
   a memory that stores computer executable components; and
   a processor that executes the computer executable components stored in the memory, wherein the computer executable components comprise:
      a security component that implements an instance of an encapsulated security application, wherein the encapsulated security application is embedded into a container image as an extended analytic script;
      an execution component that applies the instance of the encapsulated security application to a simulated system state of a computing device during subsequent scanning operations that result in respective analytics for scanning operations of the subsequent scanning operations;
      a builder component that creates the encapsulated security application based on deployment of a security application onto an image, wherein the image is a combination of a file system for the security application and parameters associated with the security application.

2. The system of claim 1, wherein the simulated system state is decoupled from an original operating state of the computing device and comprises data abstracted from the original operating state, and wherein the data abstracted represents an operation of the computing device.

3. A computer-implemented method, comprising:
implementing, by a system operatively coupled to a processor, an instance of an encapsulated security application, wherein the encapsulated security application is embedded into a container image as an extended analytic script;
applying the instance of the encapsulated security application to a simulated system state of a computing device during subsequent scanning operations that result in respective analytics for scanning operations of the subsequent scanning operations; and
creating, by the system, the encapsulated security application based on deployment of a security application onto an image, wherein the image is a combination of a file system for the security application and parameters associated with the security application.

4. The computer-implemented method of claim 3, further comprising:
facilitating, by the system, a black-box execution of software over the simulated system state, wherein the black-box execution of software comprises running software applications and encapsulated security applications in the simulated system state as if the running software applications were executing in an original operating state of the computing device.

5. The system of claim 1, wherein the computer executable components further comprise a storage component that maintains an image repository for the image and other images associated with other encapsulated security applications.

6. The system of claim 5, wherein the computer executable components further comprise an indication component that monitors the image repository and provides a notification to the execution component upon detection of the image, wherein the image was not previously retained in the image repository.

7. The system of claim 1, wherein the computer executable components further comprise a record component that evaluates a history of the image for a label that designates a main executable file inside the image.

8. The system of claim 1, wherein the computer executable components further comprise a generation component that facilitates black-box execution of software over the simulated system state, wherein the black-box execution of software comprises running software applications in the simulated system state as if the running software applications and the encapsulated security application were executing in an original operating state of the computing device.

9. The system of claim 1, wherein the computer executable components further comprise:
a notification component that generates one or more event notifications in response to the simulated system state, wherein the one or more event notifications are decoupled from an original operating state of the computing device.

10. The computer-implemented method of claim 3, further comprising:

evaluating, by the system, a history of the image for a label that designates a main executable file inside the image.

11. The computer-implemented method of claim 3, wherein the simulated system state is decoupled from an original operating state of the computing device and comprises data abstracted from the original operating state, and wherein the data abstracted represents an operation of the computing device.

12. The computer-implemented method of claim 3, further comprising:
maintaining, by the system, an image repository for the image and other images associated with other encapsulated security applications; and
providing, by the system, a notification based upon detection of the image in the image repository, wherein the image was not previously retained in the image repository.

13. The computer-implemented method of claim 3, further comprising:
generating one or more event notifications in response to the simulated system state, wherein the one or more event notifications are decoupled from an original operating state of the computing device.

14. A computer program product that facilitates cloud-native extensibility provided to security analytics, the computer program product comprising a computer readable storage medium having program instructions embodied therewith, the program instructions are executable by a processor to cause the processor to:
implement an instance of an encapsulated security application, wherein the encapsulated security application is embedded into a container image as an extended analytic script;
apply the instance of the encapsulated security application to a simulated system state of a computing device during subsequent scanning operations that result in respective analytics for scanning operations of the subsequent scanning operations; and
create the encapsulated security application based on deployment of a security application onto an image, wherein the image is a combination of a file system for the security application and parameters associated with the security application.

15. The computer program product of claim 14, wherein the simulated system state is decoupled from an original operating state of the computing device and comprises data abstracted from the original operating state, and wherein the data abstracted represents an operation of the computing device.

16. The computer program product of claim 14, wherein the program instructions cause the processor to:
maintain an image repository for the image and other images associated with other encapsulated security applications; and
provide a notification based upon detection of the image in the image repository, wherein the image was not previously retained in the image repository.

17. The computer program product of claim 14, wherein the program instructions cause the processor to:
facilitate a black-box execution of software over the simulated system state, wherein the black-box execution of software comprises running software applications and the encapsulated security application in the simulated system state as if the running software applications were executing in an original operating state of the computing device.

\* \* \* \* \*